(12) United States Patent
Ohnishi et al.

(10) Patent No.: US 6,885,412 B2
(45) Date of Patent: Apr. 26, 2005

(54) LIQUID CRYSTAL DISPLAY DEVICE, IMAGE SHIFTING DEVICE, AND IMAGE DISPLAY APPARATUS

(75) Inventors: Noriaki Ohnishi, Nara (JP); Yasuhiro Kume, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 74 days.

(21) Appl. No.: 10/645,518

(22) Filed: Aug. 22, 2003

(65) Prior Publication Data

US 2004/0036834 A1 Feb. 26, 2004

(30) Foreign Application Priority Data

Aug. 22, 2002 (JP) ........................................ 2002-241661
Jun. 6, 2003 (JP) ........................................ 2003-161472

(51) Int. Cl.⁷ ............................ G02F 1/133; G02F 1/13; C09F 19/02
(52) U.S. Cl. .................... 349/72; 349/177; 349/186; 349/199
(58) Field of Search ............................... 349/177, 186, 349/199, 72

(56) References Cited

U.S. PATENT DOCUMENTS 4,688,900 A * 8/1987 Doane et al. ................. 349/87
6,061,103 A 5/2000 Okamura et al.
6,532,046 B1 * 3/2003 Yamashita et al. ............. 349/86
6,535,194 B1 3/2003 Hanano et al.
6,551,670 B2 * 4/2003 Tahara et al. ................. 428/1.3

FOREIGN PATENT DOCUMENTS

| JP | 2-55322 A | 2/1990 |
| JP | 8-171084 A | 7/1996 |
| JP | 9-96824 A | 4/1997 |
| JP | 2001-83480 A | 3/2001 |

OTHER PUBLICATIONS

H. Ichinose et al., Preliminary Material of 23$^{rd}$ Liquid Crystal Symposium, Tokyo, pp. 212–213, 1997.

* cited by examiner

*Primary Examiner*—Huyen Ngo
(74) *Attorney, Agent, or Firm*—Birch, Stewart, Kolasch & Birch, LLP

(57) ABSTRACT

A liquid crystal display device includes a first substrate, a second substrate opposing the first substrate, a liquid crystal layer provided in a gap between the first substrate and the second substrate, and a temperature adjustment member formed on the first substrate and/or the second substrate. The panel temperature T (° C.) of the liquid crystal display device is controlled to be equal to or greater than $T_{NI}$-65 and less than or equal to $T_{NI}$-15, where $T_{NI}$ (° C.) is the nematic-isotropic phase transition temperature of the liquid crystal composition of the liquid crystal layer.

27 Claims, 10 Drawing Sheets

Light from backlight

LIQUID CRYSTAL DISPLAY DEVICE, IMAGE SHIFTING DEVICE, AND IMAGE DISPLAY APPARATUS

This non-provisional application claims priority under 35 U.S.C. § 119(a) on Patent Application Nos. 2002-241661 and 2003-161472 filed in Japan on Aug. 22, 2002 and Jun. 6, 2003, which are herein incorporated by reference.

BACKGROUND OF THE INVENTION

1. Field of the Invention

The present invention relates to a liquid crystal display device and an image shifting device. The liquid crystal display device and the image shifting device of the present invention can be used in an image display apparatus, e.g., a transmission type display apparatus such as a projector.

2. Description of the Background Art

Liquid Crystal Display Device

Japanese Laid-Open Patent Publication Nos. 2-55322 and 9-96824 disclose techniques for improving the response speed of a liquid crystal panel by increasing the temperature of the liquid crystal material with a transparent heater provided in the liquid crystal panel. With these techniques, some improvement can be expected in the response speed of the liquid crystal material by heating the liquid crystal panel. However, an increase in the panel temperature may lead to deterioration of the liquid crystal property of the liquid crystal composition, and the anisotropy of the liquid crystal material may be lost near the nematic-isotropic phase transition temperature ($T_{NI}$), whereby a sufficient display quality cannot be maintained.

Japanese Laid-Open Patent Publication No. 8-171084 discloses a technique for controlling the temperature of a liquid crystal panel while applying a voltage across the liquid crystal material so as to maximize the contrast ratio of the displayed image. With this technique, deterioration of the displayed image can be prevented to some degree. However, this publication fails to provide clear guidelines as to how the panel temperature should be controlled for various panels using various liquid crystal materials and specifications. Moreover, the configuration of the heating panel and the control system therefor is very complicated. Therefore, the disclosed technique cannot easily be applied to many types of liquid crystal display apparatuses.

Japanese Laid-Open Patent Publication No. 2001-83480 discloses a technique for controlling the temperature of a liquid crystal panel. Specifically, the publication discloses a cholesteric liquid crystal display apparatus in which the cholesteric liquid crystal material is driven at a temperature that is higher than room temperature and lower than the isotropic phase temperature aiming at increasing the speed of the orientation transition of the cholesteric liquid crystal material. However, it is difficult to apply such a temperature controlling technique to liquid crystal display apparatuses of a type in which the selective reflection of a cholesteric liquid crystal material is controlled with an electric field.

In recent years, the response speed, the brightness and the contrast ratio of liquid crystal display devices have been increased rapidly, and there has been a demand for liquid crystal display apparatuses and projection type liquid crystal display apparatuses capable of displaying moving images while ensuring a high display quality.

Image Shifting Device

U.S. Pat. No. 6,061,103 and Japanese Laid-Open Patent Publication No. 8-194207 disclose a technique for realizing a high definition image display by optically shifting red, green and blue pixels from one another using an image shifting device to form a combined image in a time-division manner. The combination of a liquid crystal device and a birefringence device is proposed as the image shifting device. In this way, the apparent resolution can be tripled. Although each pixel only displays one of red, green and blue without the image shifting (wobbling) using the image shifting device, it is possible to realize a full color display with an improved image resolution by shifting images of different colors to form a combined image in a time-division manner.

As for the method for driving an image display apparatus, an interlaced driving method, a non-interlaced driving method, and the like, are widely employed. In an interlaced driving method, odd-numbered rows and even-numbered rows are selected alternately field by field to form a combined image from an odd-numbered field and an even-numbered field. The selection time for each field is typically 16.6 ms (milliseconds) (60 Hz). In the non-interlaced driving method, rows of an image is selected successively irrespective of whether they are odd- or even-numbered rows. The selection time for each field is typically 16.6 ms (60 Hz) also in the non-interlaced driving method. The term "field" refers to a vertical sync period, and with liquid crystal display apparatuses, the scanning period including the blanking period corresponds to the field period.

In the image display apparatus disclosed in U.S. Pat. No. 6,061,103 and Japanese Laid-Open Patent Publication No. 8-194207, each field period is divided into "subfield periods" corresponding to the red, green and blue pixel shift positions, and a different image is displayed in each subfield period. The image shifting operation by the image shifting device needs to be synchronized with the timing at which a subfield is switched to another. Since the subfield period obtained by dividing one field period is as short as about 5 ms, it is important that the polarization of the liquid crystal device transitions quickly upon switching of subfields.

However, when a conventional liquid crystal device is used, the response time may be longer than the subfield selection time, or the rising response time ($\tau_{on}$) may be different from the falling response time ($\tau_{off}$), whereby the timing at which the image shifting operation is performed may be shifted. When the image shift timing is shifted, a double image phenomenon occurs, and flicker occurs due to the double image phenomenon. In such a case, the image quality is deteriorated substantially.

As described above, for image display apparatuses that use the wobbling technique, it is necessary to improve the response speed of the liquid crystal device of the image shifting device, and it is also necessary for the image-displaying liquid crystal display device to have a high response speed that matches the subfield period to be selected. Therefore, when a conventional liquid crystal device is used, further improvements in the image quality are required.

By using two or more sets of liquid crystal devices and birefringence devices, it is possible to obtain an image shifting device having three or more shift positions. In such an image shifting device, it is necessary that the liquid crystal devices have a uniform response speed, which is not required for an image shifting device using only one liquid crystal device. If each liquid crystal device has a different response time, the image shift timing will be varied, thereby deteriorating the image quality significantly. Therefore, it is necessary to maintain a uniform temperature for all the liquid crystal devices.

Moreover, it is very important to design a liquid crystal device in view of the panel temperature and the temperature characteristics of the liquid crystal composition so that the liquid crystal device provides a high quality and a high response speed for various liquid crystal panel structures and display modes. Normally, the display properties related to the image quality such as the brightness and the contrast deteriorate by simply heating the liquid crystal panel. In addition, if one attempts to realize a high response speed that matches the subfield period only for the liquid crystal devices of the image shifting device, it is difficult to realize an image display apparatus having a high quality and a high definition. Thus, it is important that the liquid crystal display device for modulating light from the light source according to input signals be capable of displaying image information in synchronization with the subfield period so as to guide the image information to the image shifting device. Therefore, it is required to uniformly control the temperature of the liquid crystal display device and that of the image shifting device.

Japanese Laid-Open Patent Publication No. 11-326877 discloses an image display apparatus that incorporates a mechanism for adjusting the temperature of the image shifting device (vibration means) for the purpose of improving the response speed of the liquid crystal device. Specifically, the publication discloses providing a sheet heater around the liquid crystal device of the image shifting device to directly heat the liquid crystal device. The publication also discloses other approaches, e.g., making the transparent conductive film of the liquid crystal device so that the transparent conductive film itself functions as a heater, and providing a transparent heater pattern on the liquid crystal device. However, it fails to disclose any of the possible problems confronted when adjusting the temperature of the image shifting device.

SUMMARY OF THE INVENTION

An object of the present invention is to provide a liquid crystal display apparatus and a projection type liquid crystal display apparatus in which the panel response speed is improved without lowering the display properties related to the image quality such as the brightness and the contrast. State-of-the-art liquid crystal display apparatuses do not provide a sufficient response speed at intermediate gray levels, whereby after-image phenomenon, and the like, are observed when displaying moving images. Accordingly, there is a demand for a liquid crystal panel capable of displaying moving images in full color with a high quality. Attempts have been made in the art to increase the response speed of liquid crystal display apparatuses by, for example, employing high-speed display modes and driving methods and improving liquid crystal materials. However, these approaches require complicated panel designs. Thus, it has been desired to develop a simpler approach for increasing the response speed.

The present invention aims at realizing a liquid crystal display apparatus capable of displaying an image with a high quality and with a high response speed for various liquid crystal panels and display modes by designing the apparatus in view of the panel temperature and the temperature characteristics of the liquid crystal composition.

Another object of the present invention is to provide an improved image shifting device by shortening the response time to the voltage level of the liquid crystal display device or that of the liquid crystal device of the image shifting device. Still another object of the present invention is to improve the uniformity of voltage response among the liquid crystal devices so as to improve the response speed of the liquid crystal material in a subfield period, thereby providing an image display apparatus utilizing the image shifting technique with which an image can be displayed with a high quality and with a high resolution.

In order to solve the problems set forth above, the panel temperature of the liquid crystal display apparatus is set within an optimal range with respect to the liquid crystal composition of the liquid crystal layer and the phase transition temperature. Moreover, the rotational viscosity value of the liquid crystal composition, which is dependent on the temperature characteristics, is optimized so as to solve the problems.

Specifically, a temperature adjustment member is provided in the liquid crystal display apparatus so as to control the temperature of the liquid crystal panel in an optimal temperature range, thereby achieving the objects. Furthermore, the problems are solved more effectively by defining an optimal value also for the rotational viscosity value $\gamma_1$, while taking into consideration that the temperature dependence of the physical properties of the liquid crystal composition forming the liquid crystal layer may change.

Also disclosed herein is a technique for increasing the resolution by shifting pixel information of an image of the display device from one another so as to display a combined image in a time-division manner. More particularly, the present specification discloses a technique for preventing flicker due to a double image phenomenon, color mixing and color bleeding, by improving the response speed of the liquid crystal material of the display device so that it matches the switching of subfields and by improving the voltage response speed of the image shifting device.

Specifically, a temperature adjustment member is provided in the display device and the image shifting device for controlling the temperature of the liquid crystal panel in an optimal temperature range so as to improve the response speed, thereby achieving the objects. Furthermore, the problems are solved more effectively by defining the rotational viscosity value $\gamma_1$, etc., of the liquid crystal composition in the liquid crystal panel of the display device or the image shifting device.

Typically, when a nematic liquid crystal material is used, the dynamic switching behavior of the liquid crystal molecules in response to an electric field can be represented approximately by the following expressions:

$$\tau_{off} = \gamma_1 d^2 / K\pi^2 \qquad \text{Expression 1}$$

$$\tau_{on} = \tau_{off} / \{(V^2/V_{th}^2) - 1\} \qquad \text{Expression 2}$$

$$V_{th} = \pi (K/\Delta\epsilon)^{1/2} \qquad \text{Expression 3}$$

where $\tau_{off}$ is the response time after turning OFF the voltage application to the panel (falling time), $\tau_{on}$ is the response time after turning ON the voltage application to the panel (rising time), $V_{th}$ is the threshold voltage, V is the applied voltage, d is the thickness of the liquid crystal cell, $\gamma_1$ is the rotational viscosity of the liquid crystal composition, K is the elastic constant of the liquid crystal material, and $\Delta\epsilon$ is the dielectric anisotropy of the liquid crystal material.

As can be seen from these expressions, possible approaches for increasing the response speed of a liquid crystal display apparatus include: (1) reducing the thickness of the liquid crystal cell; (2) increasing the voltage applied to drive the liquid crystal panel; and (3) optimizing the physical parameters of the liquid crystal material.

However, these approaches entail the following problems. For Approach (1), a reduction in the thickness of the liquid crystal cell narrows the tolerance of the cell thickness in the manufacture of the liquid crystal display apparatus, which not only lowers the production yield but also is likely to lower the brightness, a display quality, of the liquid crystal panel. Then, it is necessary to use a liquid crystal material having a high Δn value, and the wavelength dispersion is likely to become prominent. Therefore, also from an optical design point of view, this approach can be used only to a limited extent.

For Approach (2), the response time, particularly the rising time, can be shortened by increasing the voltage applied to drive the liquid crystal panel. However, this approach cannot be used easily because it increases the power consumption.

For Approach (3), the reduction of the rotational viscosity $\gamma_1$, among other physical parameters of the liquid crystal material to be optimized, is effective in shortening both of the response times, i.e., $\tau_{off}$ and $\tau_{on}$. However, it needs to be well balanced with other parameters of the liquid crystal material, e.g., Δε and Δn. Moreover, since the physical properties of each material are dependent on the temperature, it is very important to select a suitable material.

In the present invention, the response speed of the liquid crystal material is increased by adjusting the panel temperature and further by adjusting the rotational viscosity $\gamma_1$ of the liquid crystal composition of the liquid crystal layer. Particularly, by optimizing the rotational viscosity $\gamma_1$ of the liquid crystal composition, it is possible to effectively improve the low response speed of a liquid crystal display apparatus at intermediate gray levels.

It is known in the art that the rotational viscosity coefficient $\gamma_1$ of a liquid crystal material satisfies the Andrade's formula below, as those of common liquids.

Andrade's formula: $\gamma_1 = A \exp(B/T)$  Expression 4 where A and B are constants, and T is the absolute temperature.

It can be seen from the expression that the rotational viscosity $\gamma_1$ decreases exponentially as the temperature increases. Moreover, it can be seen that adjusting the temperature is effective in improving the response speed of a liquid crystal display apparatus. Other physical properties of a liquid crystal material, e.g., Δε and Δn, change so that the anisotropy thereof decreases as the temperature increases, as does the order parameter S. Therefore, a comprehensive design that takes into consideration the temperature dependence of the various physical properties is necessary. From a response speed point of view, it is believed to be most effective to design the liquid crystal panel focusing on the rotational viscosity while adjusting the optical and electrical anisotropy dependent on the temperature.

A liquid crystal display device of the present invention includes: a first substrate; a second substrate opposing the first substrate; a liquid crystal layer provided in a gap between the first substrate and the second substrate; and a temperature adjustment member formed on the first substrate and/or the second substrate, wherein a panel temperature T (° C.) of the liquid crystal display device is controlled to be equal to or greater than $T_{NI}$-65 and less than or equal to $T_{NI}$-15, preferably equal to or greater than $T_{NI}$-30 and less than or equal to $T_{NI}$-20, where $T_{NI}$ (° C.) is a nematic-isotropic phase transition temperature of a liquid crystal composition of the liquid crystal layer.

It is preferred that a rotational viscosity $\gamma_1$ of the liquid crystal composition is less than or equal to 200 mPa·s at a temperature of $T_{NI}$-25 (° C.). Moreover, it is preferred that the rotational viscosity $\gamma_1$ of the liquid crystal composition is equal to or greater than 20 mPa·s at a temperature of $T_{NI}$-25 (° C.).

The temperature adjustment member may include a light-transmissive temperature application section formed on at least one surface of the first substrate and the second substrate, and a temperature control section connected to the temperature application section.

The temperature application section may be made of a transparent conductive film. Moreover, the temperature application section may be formed, by patterning, corresponding to a predetermined display area. The term "display area" as used herein refers to an area across which pixels, each being a minimum unit of display, are arranged in a matrix pattern. Note that in an active matrix type liquid crystal display apparatus, each "pixel region" is defined by a pixel electrode and a counter electrode opposing the pixel electrode. In a passive matrix type liquid crystal display apparatus, each "pixel region" is defined by one of column electrodes arranged in a stripe pattern and one of row electrodes arranged perpendicular to the column electrodes. In an arrangement with a black matrix, strictly speaking, a pixel region is a portion of each region across which a voltage is applied according to the intended display state that corresponds to an opening of the black matrix. The "display area" as used herein may include a region where the black matrix is provided.

A display electrode may be formed on the temperature application section via a transparent insulating layer. The temperature application section may be an infrared heater. The temperature adjustment member may include a Peltier device.

A projection type display apparatus according to a first aspect of the present invention includes: a light source; a color separation optical system for dividing a light beam from the light source into a plurality of color light beams of different colors; a plurality of liquid crystal display devices provided so as to correspond respectively to the plurality of color light beams separated by the color separation optical system; a color synthesis optical system for synthesizing together the plurality of color light beams modulated respectively through the plurality of liquid crystal display devices; and a projection optical system for projecting the plurality of color light beams, which have been synthesized together by the color synthesis optical system, wherein at least one of the plurality of liquid crystal display devices is the liquid crystal display device of the present invention.

An image shifting device of the present invention includes at least one set of a liquid crystal device for modulating polarization of light and a birefringence device for shifting an optical path of the light according to the polarization of the light output from the liquid crystal device, wherein: the liquid crystal device includes a first substrate, a second substrate opposing the first substrate, a liquid crystal layer provided in a gap between the first substrate and the second substrate, and a temperature adjustment member formed on the first substrate and/or the second substrate; and a panel temperature T (° C.) of the liquid crystal device is controlled to be equal to or greater than $T_{NI}$-65 and less than or equal to $T_{NI}$-15, where $T_{NI}$ (° C.) is a nematic-isotropic phase transition temperature of a liquid crystal composition of the liquid crystal layer.

It is preferred that a rotational viscosity $\gamma_1$ of the liquid crystal composition is less than or equal to 200 mPa·s at a temperature of $T_{NI}$-25 (° C.). It is preferred that a rotational viscosity $\gamma_1$ of the liquid crystal composition is equal to or greater than 20 mPa·s at a temperature of $T_{NI}$-25 (° C.).

The temperature adjustment member may include a light-transmissive temperature application section formed on at least one surface of the first substrate and the second substrate, and a temperature control section connected to the temperature application section.

The temperature application section may be made of a transparent conductive film. Moreover, the temperature application section may be formed, by patterning, corresponding to a predetermined display area.

A display electrode may be formed on the temperature application section via a transparent insulating layer. The temperature application section may be an infrared heater. The temperature adjustment member may include a Peltier device. The birefringence device may include a temperature adjustment member.

An image display apparatus according to a first aspect of the present invention includes: a light source; the liquid crystal display device of the present invention for modulating light from the light source; and an image shifting device provided on a light-exiting side of the liquid crystal display device for optically shifting, for every display frame, an image displayed on the liquid crystal display device.

An image display apparatus according to a second aspect of the present invention includes: a display device; and the image shifting device of the present invention provided on a light-exiting side of the display device. The display device may be the liquid crystal display device of the present invention. The image shifting device may shift light output from the display device in synchronization with a display operation of the display device.

A projection type liquid crystal display apparatus according to a second aspect of the present invention includes: a light source; the liquid crystal display device of the present invention for modulating light from the light source; an image shifting device provided on a light-exiting side of the liquid crystal display device for optically shifting, for every display frame, an image displayed on the liquid crystal display device; and a projection optical system for projecting a combined image of shifted images from the image shifting device.

A projection type liquid crystal display apparatus according to a third aspect of the present invention includes: a light source; a liquid crystal display device for modulating light from the light source; the image shifting device of the present invention provided on a light-exiting side of the liquid crystal display device; and a projection optical system for projecting a combined image of shifted images from the image shifting device. The liquid crystal display device may be the liquid crystal display device of the present invention.

With the liquid crystal display device and the projection type display apparatus of the present invention, it is possible to effectively improve the response speed to realize a high-speed liquid crystal display without detracting from the brightness and the contrast, by controlling the temperature of the liquid crystal panel in an optimal temperature range. In other words, it is possible to improve the response speed by an easy approach for liquid crystal panels of various specifications and display modes by adjusting the temperature of the liquid crystal panel in an optimal temperature range. Moreover, it is possible to more effectively improve the quality and the response speed of a liquid crystal display by defining the rotational viscosity value $\gamma_1$ of the liquid crystal composition of the liquid crystal layer.

With the image shifting device of the present invention, it is possible to realize a high response speed by eliminating the non-uniformity in the liquid crystal response in the panel by controlling the temperature of the liquid crystal panel in an optimal temperature range. By applying the image shifting device of the present invention to an image display apparatus such as a projection type liquid crystal display apparatus, the display quality thereof can be improved.

DETAILED DESCRIPTION OF THE PREFERRED EMBODIMENTS

Embodiments of the present invention will now be described.

Embodiment 1 (Passive Matrix Transmission Type Liquid Crystal Display Device)

Figure 1:
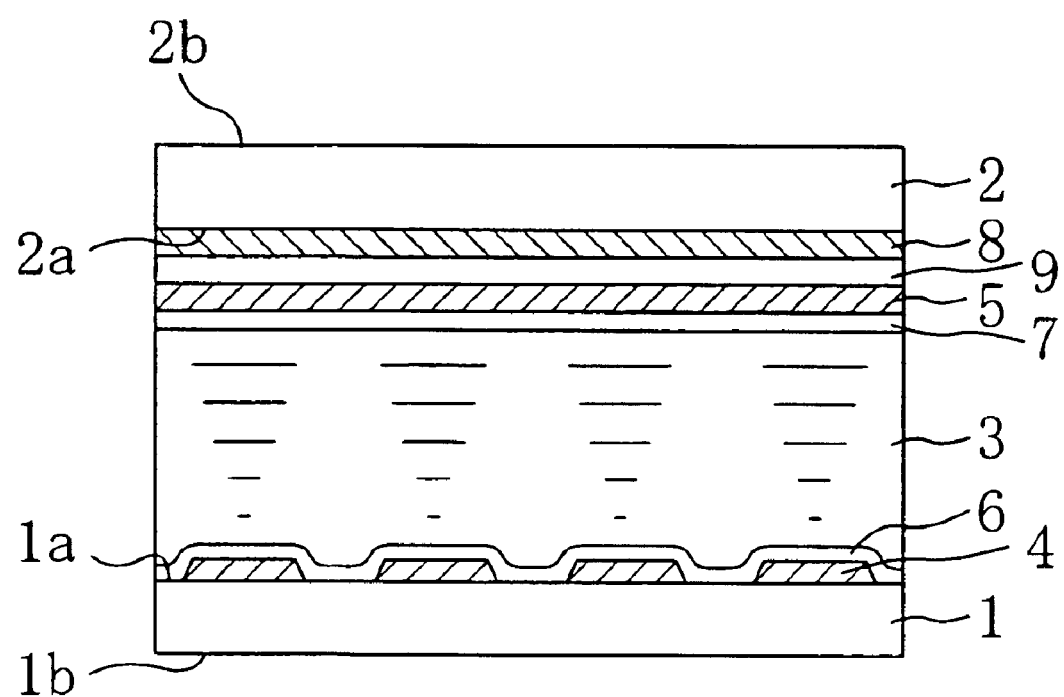
FIG. 1 is a cross-sectional view schematically illustrating a liquid crystal display device of Embodiment 1.

FIG. 1 is a cross-sectional view schematically illustrating a liquid crystal display device of Embodiment 1. The liquid crystal display device of the present embodiment will be described with reference to FIG. 1. The liquid crystal display device of the present embodiment is a passive matrix type liquid crystal display device, including a first substrate 1, a second substrate 2 opposing the first substrate 1, a liquid crystal layer 3 provided in the gap between the first substrate 1 and the second substrate 2, and a temperature adjustment member provided on the second substrate 2. A plurality of column electrodes 4 are provided in a stripe pattern on the first substrate 1. A plurality of row electrodes 5 perpendicular to the column electrodes 4 are provided on the second substrate 2. The column electrodes 4 and the row electrodes 5 are both display electrodes and may be made of a transparent conductive film such as an ITO film. Liquid crystal alignment films 6 and 7 made of polyimide are provided on the column electrodes 4 and the row electrodes 5, respectively.

Figure 2:
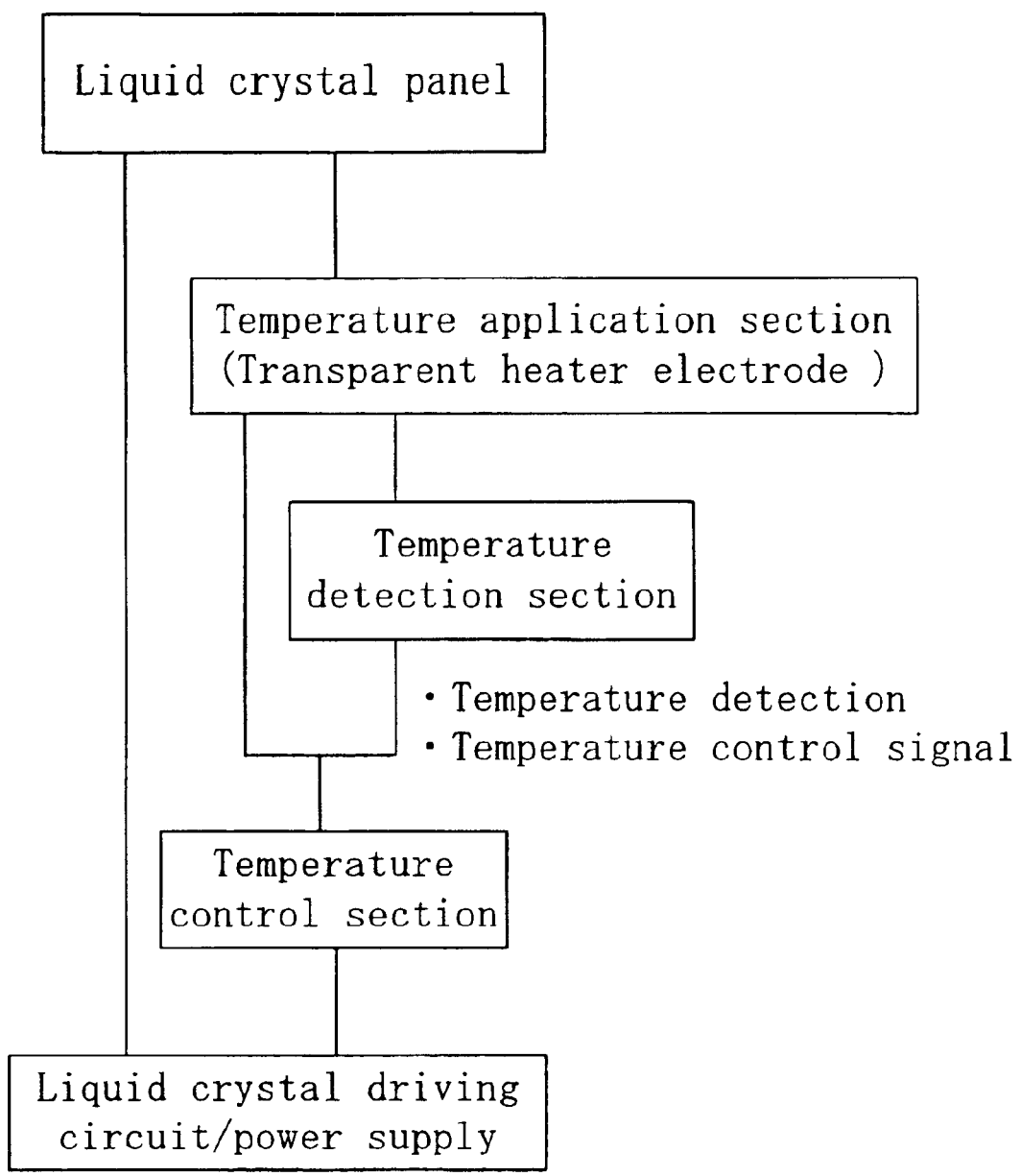
FIG. 2 illustrates the system configuration of a temperature adjustment mechanism of the liquid crystal display device of Embodiment 1.

FIG. 2 illustrates the system configuration of a temperature adjustment mechanism of the liquid crystal display device of the present embodiment. The temperature adjustment member may alternatively be formed on each of the first substrate 1 and the second substrate 2, or only on the first substrate 1, instead of forming it on the second substrate 2. The temperature adjustment member includes a light-transmissive temperature application section 8 and a temperature control section (not shown) connected to the temperature application section 8. In the present embodiment, the temperature application section 8 is formed on one surface 2a of the second substrate 2 that is closer to the liquid crystal layer 3. Alternatively, the temperature application section 8 may be provided on the outer surface 2b of the second substrate 2, or may be formed on both surfaces 2a and 2b of the second substrate 2. Moreover, the temperature application section 8 may be formed on one surface 1a of the first substrate 1 that is closer to the liquid crystal layer 3 and/or the outer surface 1b thereof, in addition to, or instead of, the temperature application section 8 formed on the second substrate 2.

The light-transmissive temperature application section 8 may be made of a conductive thin film made of a metal oxide such as ITO (indium tin oxide), $SnO_2$, ZnO, IZO (indium zinc oxide) or GZO (gallium zinc oxide). These metal oxide thin films can be formed by a method known in the art such as an EB (electron beam) vapor deposition method, a sputtering method or a sol-gel method. When a predetermined electric signal is input to the metal oxide thin film, a current flows through the thin film and there occurs a Joule's heat according to the resistance of the thin film, thereby heating the liquid crystal display device. The term "light-transmissive" as used herein refers to a property of transmitting 40% or more of light in the visible wavelength range of 400 to 800 nm. When the light transmittance in the visible range is less than 40%, the majority of the incident light is blocked, whereby a sufficient brightness cannot be obtained on the liquid crystal panel and the display quality deteriorates significantly.

In order to realize a uniform liquid crystal display, it is preferred that the uniformly-patterned temperature application section 8 as a heater electrode film is formed across the entire surface or across the pixel regions on at least one side of at least one substrate. In this way, heating of the liquid crystal panel will not be uneven. For example, a pattern disclosed in Japanese Laid-Open Patent Publication No. 5-173153 may be employed as the pattern of the temperature application section 8.

In a case where the temperature application section 8 is formed under the display electrode (the row electrodes 5) on the inner side (the side closer to the liquid crystal layer 3) of the second substrate 2, it is preferred that the temperature application section 8 is layered with the display electrode thin film via a transparent insulating film 9 therebetween. The transparent insulating film 9 may be a transparent interlayer insulating film, as those used in semiconductor processes, an organic or organic-inorganic hybrid transparent insulative coating film, or the like. In this way, it is possible to prevent leakage between the upper and lower conductive films.

A simpler way of providing a light-transmissive temperature application section may be utilizing the display electrode as a light-transmissive temperature application section. For example, the display electrode (the row electrodes 5) of the second substrate 2 may be connected to a heating power supply while appropriately designing the resistance and the thickness, of the display electrode. In this way, the display electrode functions also as a temperature application section.

Furthermore, the light-transmissive temperature application section 8 may alternatively be an external heater, instead of being an internal heater using a transparent conductive film as described above. For example, an external heater unit such as an infrared heater may be placed in contact with the liquid crystal panel. An infrared heater herein may be any member that includes an infrared/far infrared radiation lamp such as a halogen heater lamp or a tungsten lamp, or an infrared radiator such as a ceramic heater, and has a function of controlling/adjusting the radiation. Moreover, it is effective in adjusting the color reproducibility of a liquid crystal panel to use an infrared heater in combination with an optical filter for adjusting particularly the incident light of a visible wavelength close to the infrared range. Alternatively, a heat source heater using laser light or an external heater using a hot plate may be employed. Two or more of these temperature application sections may be used in combination.

The temperature control section connected to the temperature application section 8 may be a temperature control section including a detection system that detects the temperature based on the temperature dependence of the electrical resistance of an ITO film or other electrode films. For example, it is preferred that the calibration curve for the relationship between the current value of the current passed through the temperature detection section and the temperature is obtained, and an external signal is controlled by a PID (proportional integral differential) control method, a fuzzy control method, or the like, for temperature compensation based on the calibration curve. The temperature detection section may be obtained from an electrode film such as an ITO film having a predetermined resistance, for example.

Peltier device may be incorporated as the temperature adjustment member for adjusting the panel temperature. A Peltier device is a module having a heating/cooling function, utilizing the Peltier effect whereby a heating or cooling effect is obtained when a current is passed through a device having a hetero junction such as a P-N semiconductor junction. Whether a heating function or a cooling function is obtained is dependent on the direction of the current. Therefore, it is effective to employ, as the temperature adjustment member, a Peltier device in combination with a current control section.

In a liquid crystal display device including a temperature adjustment member as described above, it is possible to easily and uniformly control the temperature of the liquid crystal panel, whereby it is possible to realize a high response speed irrespective of the liquid crystal display mode or the type of the liquid crystal composition.

In the liquid crystal display device of the present invention, the panel temperature T (° C.) is preferably set in the range of $T_1 \leq T_{NI} - T \leq T_2$ (° C.) (where $T_1$=15 and $T_2$=65), whereby $T_{NI}$ (° C.) is the nematic-isotropic phase transition temperature of the liquid crystal composition of the liquid crystal layer. In other words, the panel temperature T (° C.) of the liquid crystal display device is controlled so as to be equal to or greater than $T_{NI}$-65 and less than or equal to $T_{NI}$-15. If $T_{NI}$-T is lower than the lower limit of the preferred range, i.e., $T_1$=15° C., the panel temperature is lower than the optimal temperature of the liquid crystal composition of the liquid crystal layer, thereby leading to problems such as the rotational viscosity being too high. In such a case, a sufficient response speed for the display is not obtained, and an after-image is observed significantly with frame periods for moving-image display. On the other hand, if $T_{NI}$-T is higher than the upper limit of the preferred range, i.e., $T_2$=65° C., the order parameter S, which is an indicator of the degree of anisotropy of the liquid crystal composition of the liquid crystal layer, decreases abruptly. Thus, the liquid crystal property deteriorates, and the anisotropy decreases both optically and electrically, thereby leading to problems in terms of display characteristics, including a decrease in the brightness or the contrast in an electric field control mode, and deterioration of the threshold characteristic. Moreover, it is preferred that the temperature setting satisfies $20 \leq T_{NI} - T \leq 60$ so that the response speed of the liquid crystal material is increased to be less than or equal to one frame period (1/60 second) even at intermediate gray levels.

The temperature control of the liquid crystal panel is not limited to that using a detection system such as a temperature detection section as described above. For example, when the type, or the like, of the liquid crystal composition is uniquely determined, the temperature can be detected based on, for example, the calibration curve for the relationship between the rotational viscosity value $\gamma_1$ of the liquid crystal composition and the temperature dependence of the response speed thereof High-Response-Speed Liquid Crystal High-response-speed display modes that can be used with the liquid crystal display device of the present embodiment include optical rotation modes and birefringence modes, e.g., a TN (twisted nematic) mode, an ECB (electrically controlled birefringence) mode, an OCB (optically compensated birefringence) mode, a HAN (hybrid aligned nematic) mode, an STN (super twisted nematic) mode, etc. Moreover, the liquid crystal display device of the present embodiment may be a transmission type liquid crystal display device, as well as a reflection type liquid crystal display device or a transmission/reflection type liquid crystal display device, in which case a reflection plate, etc., are used.

In the liquid crystal display device of the present embodiment, the liquid crystal composition of the liquid crystal layer 3 has a small rotational viscosity value $\gamma_1$. A liquid crystal composition with a low rotational viscosity typically has a small anisotropy optically and electrically, it is very important to select a material that is suitable for the liquid crystal mode to be employed in order to realize a high display quality and a high response speed.

In the liquid crystal display device of the present embodiment, the rotational viscosity value $\gamma_1$ is limited to a predetermined range for a temperature range that is defined with respect to the nematic-isotropic phase transition temperature $T_{NI}$ (° C.) of the liquid crystal composition. Specifically, the value $\gamma_1$ is set to be less than or equal to 200 mPa·s at the reference temperature $Ta=T_{NI}-(T_2-T_1)/2$ (° C) (where $T_1=15$ and $T_2=65$), i.e., $T_{NI}-25$ (° C.). When the rotational viscosity value $\gamma_1$ at the reference temperature Ta is larger than the value $\gamma_1$ (200 mPa·s), the effect of improving the response speed will not be sufficient, and the shadowing (tailing) after-image becomes significant when displaying images.

Moreover, it is preferred that the rotational viscosity value $\gamma_1$ is equal to or greater than 20 mpa·s at the reference temperature Ta. When the rotational viscosity value $\gamma_1$ is less than 20 mpa·s, it is difficult to maintain a sufficient optical anisotropy of the liquid crystal material. In addition, as the anisotropy of the liquid crystal material lowers abruptly, the optical characteristics corresponding to the temperature or other operating environments shift, thereby significantly lowering the brightness and the contrast. Then, the image display quality deteriorates, and the liquid crystal display device may not be of practical use.

A more preferred range of the rotational viscosity value $\gamma_1$ taking into consideration the image display characteristic and the effect of improving the response speed of the panel is where it is equal to or greater than 40 mpa·s and less than or equal to 190 mpa·s at the reference temperature Ta. Generally, the smaller the viscosity coefficient is, the easier it is to realize a high response speed. In view of the optical characteristics, however, as the viscosity coefficient is larger, the optical anisotropy is larger, whereby it is easy to maintain the brightness and the contrast of the panel to be relatively high.

The rotational viscosity value $\gamma_1$ of the liquid crystal composition can easily be obtained by a transient current measurement method of measuring the transient current of the liquid crystal panel (see, for example, Jpn. J. Appl. Phys., 33, L119 (1994) or Proc. of 23rd Liquid Crystal Symposium, p. 212 (1997 Tokyo)). In other words, the temperature dependence of the rotational viscosity value $\gamma_1$ can easily be obtained by evaluating the rotational viscosity value $\gamma_1$ by a transient current measurement method while varying the environment temperature for the liquid crystal panel.

Embodiment 2 (Active Matrix Transmission Type Liquid Crystal Display Device)

Figure 3:
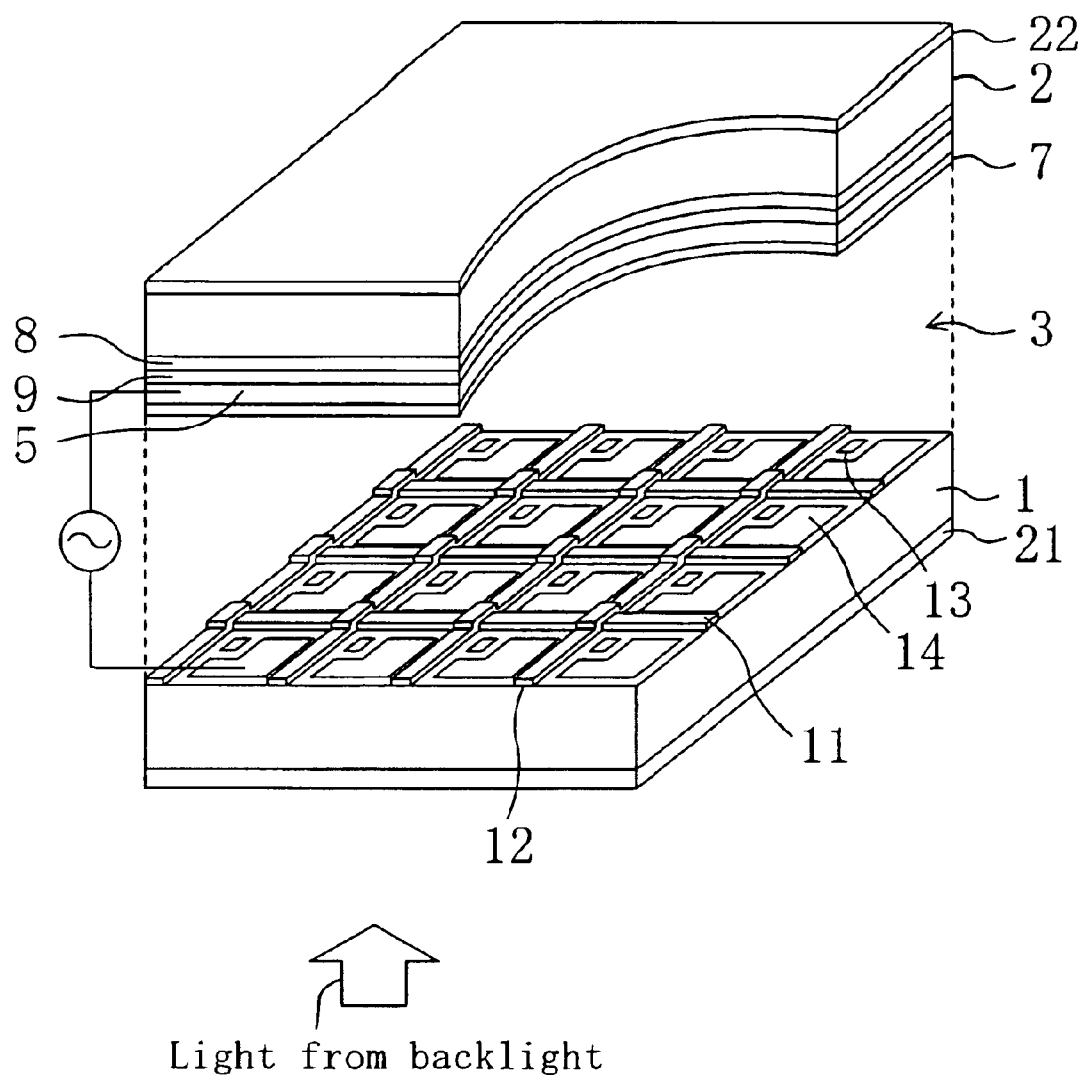
FIG. 3 is a perspective view schematically illustrating a liquid crystal display device of Embodiment 2.

FIG. 3 is a perspective view schematically illustrating a liquid crystal display device of Embodiment 2. The liquid crystal display device of the present embodiment will be described with reference to FIG. 3. Note that in FIG. 3, those components having substantially the same functions as those of the liquid crystal display device illustrated in FIG. 1 will be denoted by the same reference numerals and will not be further described below.

The liquid crystal display device of the present embodiment includes a TFT (thin film transistor) substrate 1, a counter substrate 2 opposing the TFT substrate 1, and a TN liquid crystal layer 3 provided between the substrates 1 and 2. The TFT substrate 1 includes a plurality of gate bus lines 11 extending in the row direction, a plurality of source bus lines 12 extending perpendicular to the gate bus lines 11, TFT devices 13 each provided near an intersection between the gate bus line 11 and the source bus line 12, and pixel electrodes 14 arranged in a matrix pattern and each connected to the source bus line 12 via the TFT device 13. A liquid crystal alignment film (not shown) is provided on the pixel electrodes 14 of the TFT substrate 1.

The light-transmissive temperature application section 8, the transparent insulating film 9, a counter electrode (common electrode) 5, and the liquid crystal alignment film 7 are layered in this order on the counter substrate 2, similar to the second substrate 2 of Embodiment 1.

Polarization plates 21 and 22 are provided on the outer side of the TFT substrate 1 and the counter substrate 2, respectively. In the liquid crystal display device of the present embodiment, the polarization plates 21 and 22 are arranged so that the polarization axes thereof are perpendicular to each other.

Each TFT device 13 is switched by a scanning signal provided from the gate bus line 11. A signal voltage is applied to each pixel electrode 14 that is connected to the TFT device 13 that has been turned ON by a scanning signal. The orientation of the liquid crystal molecules of the liquid crystal layer 3 is changed by the potential difference between the pixel electrode 14, to which a signal voltage is applied, and the counter electrode 5. Light from the backlight is incident upon the outer side of the TFT substrate 1 and passes through the liquid crystal layer 3, where the optical transmittance is modulated for each pixel region. In this way, an image is displayed in a transmission mode using light from the backlight.

The temperature application section 8 is connected to the temperature control section (not shown) and the temperature detection section (not shown) (see FIG. 2). When the temperature detection section detects the temperature T (° C.) of the liquid crystal panel being lower than $T_{NI}-65$ or higher than $T_{NI}-15$, a temperature control signal is input to the temperature application section 8 from the temperature control section. Thus, the temperature application section 8 is heated or cooled so as to heat or cool the liquid crystal layer 3 in the liquid crystal panel.

While the temperature adjustment member is formed on the counter substrate 2 of the liquid crystal panel in the present embodiment, the present invention is not limited to this. Alternatively, the temperature adjustment member may be formed only on the TFT substrate 1 of the liquid crystal panel, or on both of the substrates 1 and 2.

Note that while TFTs are used as active driving devices in the present embodiment, the present invention is not limited to this. For example, MIM (metal insulator metal), BTB (back-to-back diodes), diode rings, varistors, plasma switching, or the like, may be used.

In the liquid crystal display device of the present embodiment, information is written by an active matrix type electric writing method. However, the liquid crystal display device of the present invention may alternatively employ a passive matrix type electric writing method as in the liquid crystal display device of Embodiment 1. Alternatively, the liquid crystal display device of the present invention may employ an optical writing method or a heat (laser) writing method.

Embodiment 3 (Projection Type Liquid Crystal Display Apparatus)

The liquid crystal display devices of Embodiments 1 and 2 can be applied to projection type liquid crystal display apparatuses (projectors) in general. In a projection type liquid crystal display apparatus, light from the light source is passed through a liquid crystal light bulb from its back side and the transmitted light is projected onto a screen through a projection lens. Embodiment 3 is directed to a three-plate projection type liquid crystal display apparatus in which three light bulbs are provided for red light, green light and blue light, respectively.

Figure 4:
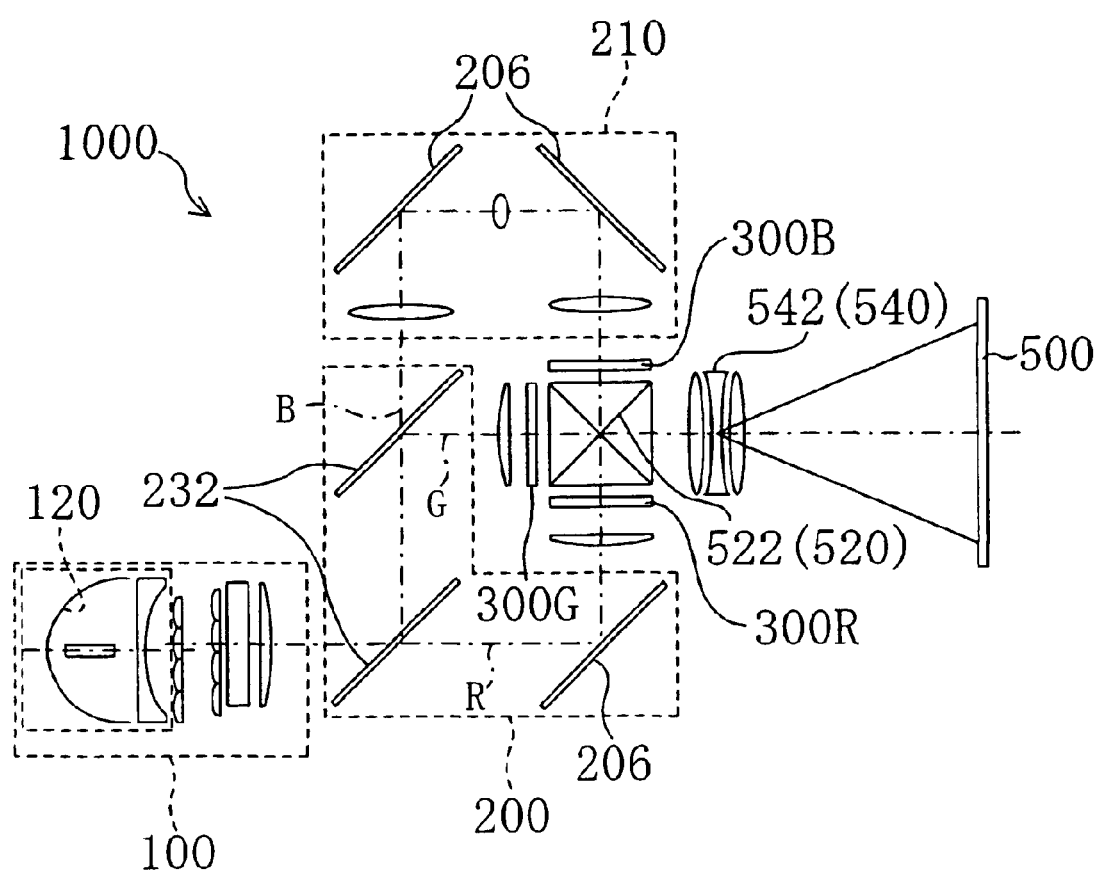
FIG. 4 is a schematic diagram illustrating a projection type liquid crystal display apparatus of Embodiment 3.

FIG. 4 is a schematic diagram illustrating a projection type liquid crystal display apparatus of the present embodiment. A projection type liquid crystal display device 1000 includes an illumination optical system 100 including a light source lamp 120, a color separation optical system 200 for separating a light beam (white light beam) from the light source lamp 120 into three primary-color light beams of red, green and blue, a relay optical system 210 including a reflection mirror 206, three liquid crystal light bulbs 300R, 300G and 300B located in the optical paths for red, green and blue light, respectively, a color synthesis optical system 520 including a cross dichroic prism 522, and a projection optical system 540 including a projection lens 542.

A light beam (white light beam) output from the illumination optical system 100 is divided into three primary-color light beams of red (R), green (G) and blue (B) through the color separation optical system 200 including dichroic mirrors 232. The color light beams separated by the color separation optical system 200 are incident upon the respective liquid crystal light bulbs 300R, 300G and 300B. The liquid crystal light bulbs 300R, 300G and 300B are each the liquid crystal display device of the present invention as described in Embodiment 1 or Embodiment 2. The color light beams are modulated according to image information by the liquid crystal light bulbs 300R, 300G and 300B, respectively. The modulated color light beams are synthesized together by the cross dichroic prism 522 of the color synthesis optical system 520. Then, the synthesized light is projected through the projection optical system 540 including the projection lens 542 onto a screen 500 as a color image.

In a projection type liquid crystal display apparatus, light from a light source lamp is made incident upon a liquid crystal light bulb, whereby the liquid crystal light bulb is locally heated. Moreover, temperature non-uniformity across the liquid crystal panel causes problems such as display non-uniformity and variations in the response speed. In such a case, the display may flicker. Providing a liquid crystal light bulb with a temperature adjustment function is advantageous in making liquid crystal display characteristics uniform as well as in increasing the response speed. The liquid crystal display device of the present invention can suitably be used as a liquid crystal light bulb because the panel temperature T (° C.) is controlled in a predetermined range.

Note that while each of the three liquid crystal light bulbs 300R, 300G and 300B is the liquid crystal display device as described in Embodiment 1 or Embodiment 2 in the present embodiment, the present invention is not limited to this as long as at least one of the three liquid crystal light bulbs is the liquid crystal display device of the present invention. For example, since the liquid crystal light bulb 300B for blue (B) receives a high emission energy and microbubbles are likely to occur near the seal, only the blue liquid crystal light bulb 300B may be the liquid crystal display device of the present invention.

In the present embodiment, a white light beam is divided into red, green and blue color light beams by the color separation optical system 200. Alternatively, the color separation optical system 200 may divide a white light beam into cyan, magenta and yellow color light beams. Alternatively, the color separation optical system 200 may divide light from the illumination optical system 100 into color light beams of four or more different colors.

The present embodiment is directed to a three-plate configuration (with three liquid crystal light bulbs) using the cross dichroic prism 522 and the dichroic mirrors 232. Alternatively, the present invention can be applied to a three-plate configuration for synthesizing color light beams together with only dichroic mirrors without using a cross dichroic prism. Moreover, while the projection type liquid crystal display apparatus of the present invention uses a plurality of liquid crystal display devices, the liquid crystal display device of the present invention can be applied to a single-plate projection type liquid crystal display apparatus. For example, the projection type liquid crystal display apparatus of the present invention may use a single color liquid crystal device in which three primary-color micro color filters of red (R), green (G) and blue (B) are layered together, or a single black-and-white liquid crystal device with three primary-color dichroic mirrors and a microlens array.

While the projection type liquid crystal display apparatus of the present embodiment is of a front projection type in which an image is projected onto a screen from the front side of the screen, the projection type liquid crystal display apparatus of the present invention may alternatively be applied to a rear projection type liquid crystal display apparatus in which an image is projected onto a screen from the rear side of the screen by using a reflection mirror.

Embodiment 4 (Image Shifting Device)

Figure 5:
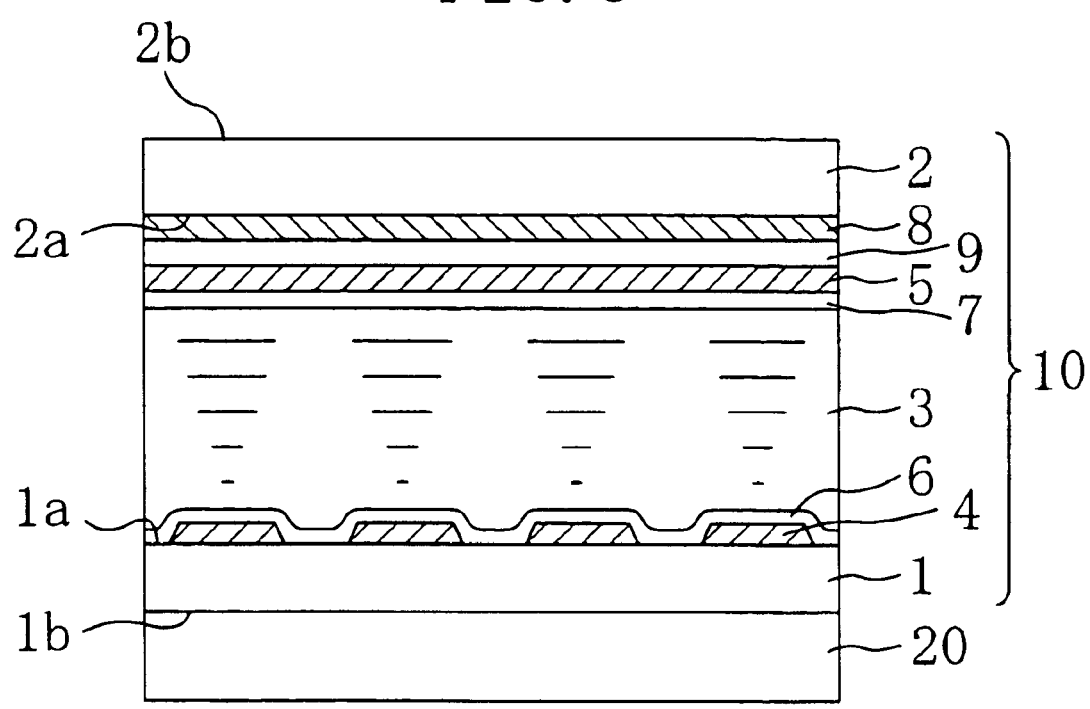
FIG. 5 is a cross-sectional view schematically illustrating an image shifting device of Embodiment 4.

FIG. 5 is a cross-sectional view schematically illustrating an image shifting device of the present embodiment. The image shifting device of the present embodiment includes a liquid crystal device 10 provided on the light-receiving side, and a birefringence device 20 provided on the light-exiting side. Note that the number of sets of the liquid crystal device 10 and the birefringence device 20 provided in the image shifting device is not limited to any particular number as long as the image shifting device includes at least one set of the liquid crystal device 10 and the birefringence device 20.

The liquid crystal device 10 is a passive matrix type liquid crystal device having a similar structure to that of the liquid crystal display device of Embodiment 1, and the various components of the liquid crystal device 10 of the present embodiment will not be further described below as they have already been described in Embodiment 1. Note that in FIG. 5, those components having substantially the same functions as those of the liquid crystal display device of Embodiment 1 will be denoted by the same reference numerals. The liquid crystal device 10 may employ any of the various display modes well known in the art, including a TN (twisted nematic) mode, an OCB (optically compensated birefringence) mode, an FLC (ferroelectric liquid crystal) mode, etc.

The birefringence device 20 has a function of shifting the path of a light beam according to the polarization direction of the incident linearly-polarized light. The birefringence device 20 is a birefringent plate of a uniaxial crystal material having a thickness of t. For example, materials that can be used for the birefringence device 20 include quartz, lithium niobate, calcite, mica, rutile ($TiO_2$), and Chile niter ($NaNO_3$).

Figure 6:
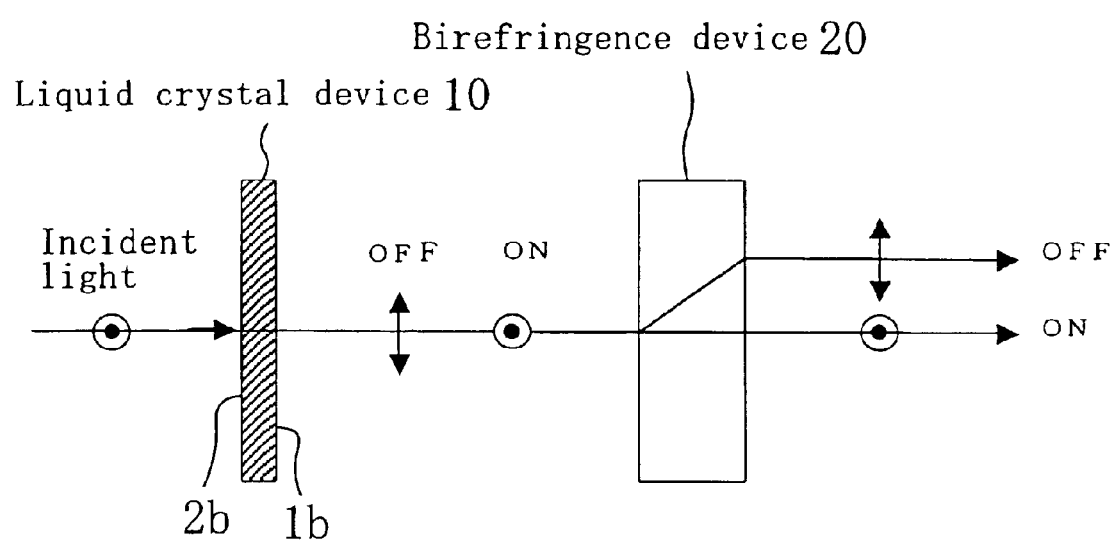
FIG. 6 illustrates the operation of an image shifting device.

FIG. 6 illustrates the operation of the image shifting device. The operation of the image shifting device of the present embodiment will be described with reference to FIG. 5 and FIG. 6. The liquid crystal device 10 includes the first surface 2b upon which light is incident, and the second surface 1b through which light is output, and is capable of changing the polarization of light according to ON/OFF (presence/absence) of an applied voltage. In other words, the liquid crystal device 10 can be switched between two states, one in which the incident light is transmitted therethrough without rotating the polarization axis thereof, and the other in which the polarization axis is rotated by about 90°. Note that the term "polarization direction" as used herein refers to a direction that is perpendicular to the light propagation direction and is parallel to the plane in which the electric field vector vibrates.

The switching of the liquid crystal device 10 is controlled by the voltage applied across the liquid crystal layer 3. Referring to FIG. 6, assume a case where polarized light whose polarization axis is perpendicular to the drawing sheet comes from the left side of the liquid crystal device 10 and is incident upon the first surface 2b. In the absence of an applied voltage (e.g., 0 V) across the liquid crystal device 10, the polarized light is output from the second surface 1b of the liquid crystal device 10 while the polarization axis thereof is rotated by about 90°. The polarization axis of the output light is parallel to the drawing sheet.

On the other hand, in the presence of an applied voltage (e.g., 5 V) across the liquid crystal device 10, the polarized light is output from the second surface 1b of the liquid crystal device 10 while the polarization axis thereof is not rotated. The polarization axis of the output light is still perpendicular to the drawing sheet.

When the voltage application across the liquid crystal device 10 is OFF, the light is shifted through the birefringence device 20 as an extraordinary ray. On the other hand, when the voltage application across the liquid crystal device 10 is ON, the light (ordinary ray) is not shifted through the birefringence device 20. The amount of shift can be adjusted by changing the thickness t of the birefringence device 20. In a case where the total weight of the display apparatus needs to be small, as with head-mounted displays (HMD), it is preferred that a material with a relatively large refractive index anisotropy ($\Delta n$) such as lithium niobate or rutile. With a material having a high $\Delta n$ value, the thickness t of the birefringence device 20 can be reduced as necessary to obtain an intended image shifting amount, and such a material is thus suitable for reducing the size and weight of the display apparatus.

As the liquid crystal display device of Embodiment 1, the image shifting device of the present embodiment includes a temperature adjustment member. The temperature adjustment member may be formed on both of the first substrate 1 and the second substrate 2, or may alternatively be formed only on the first substrate 1 instead of forming it on the second substrate 2. The temperature adjustment member includes the light-transmissive temperature application section 8 and a temperature control section (not shown) connected to the temperature application section 8. In the present embodiment, the temperature application section 8 is formed on one surface 2a of the second substrate 2 that is closer to the liquid crystal layer 3. Alternatively, the temperature application section 8 may be provided on the outer surface 2b of the second substrate 2, or may be formed on both surfaces 2a and 2b of the second substrate 2. Moreover, the temperature application section 8 may be formed on the surface 1a of the first substrate 1 that is closer to the liquid crystal layer 3 or between the outer surface 1b of the first substrate 1 and the birefringence device 20, in addition to, or instead of, the temperature application section 8 formed on the second substrate 2. Furthermore, the temperature application section 8 may be formed on the outer surface of the birefringence device 20.

Since the image shifting device of the present embodiment includes the temperature adjustment member for uniformly controlling the temperature of the liquid crystal device 10 at an optimal value, the response speed of the liquid crystal material is improved. In this way, the image shifting operation by the liquid crystal device 10 is improved, thereby stabilizing the display quality.

While the present embodiment is directed to a passive matrix type liquid crystal device, an active matrix type liquid crystal display device as described in Embodiment 2 may alternatively be used as the liquid crystal device 10.

Embodiment 5 (Image Display Apparatus)

The liquid crystal display device and the image shifting device of the present invention can be applied to an image display apparatus using the image shifting technique. Thus, it is possible to significantly improve the response speed of the device, which has been difficult to improve in conventional image display apparatuses.

Figure 7:
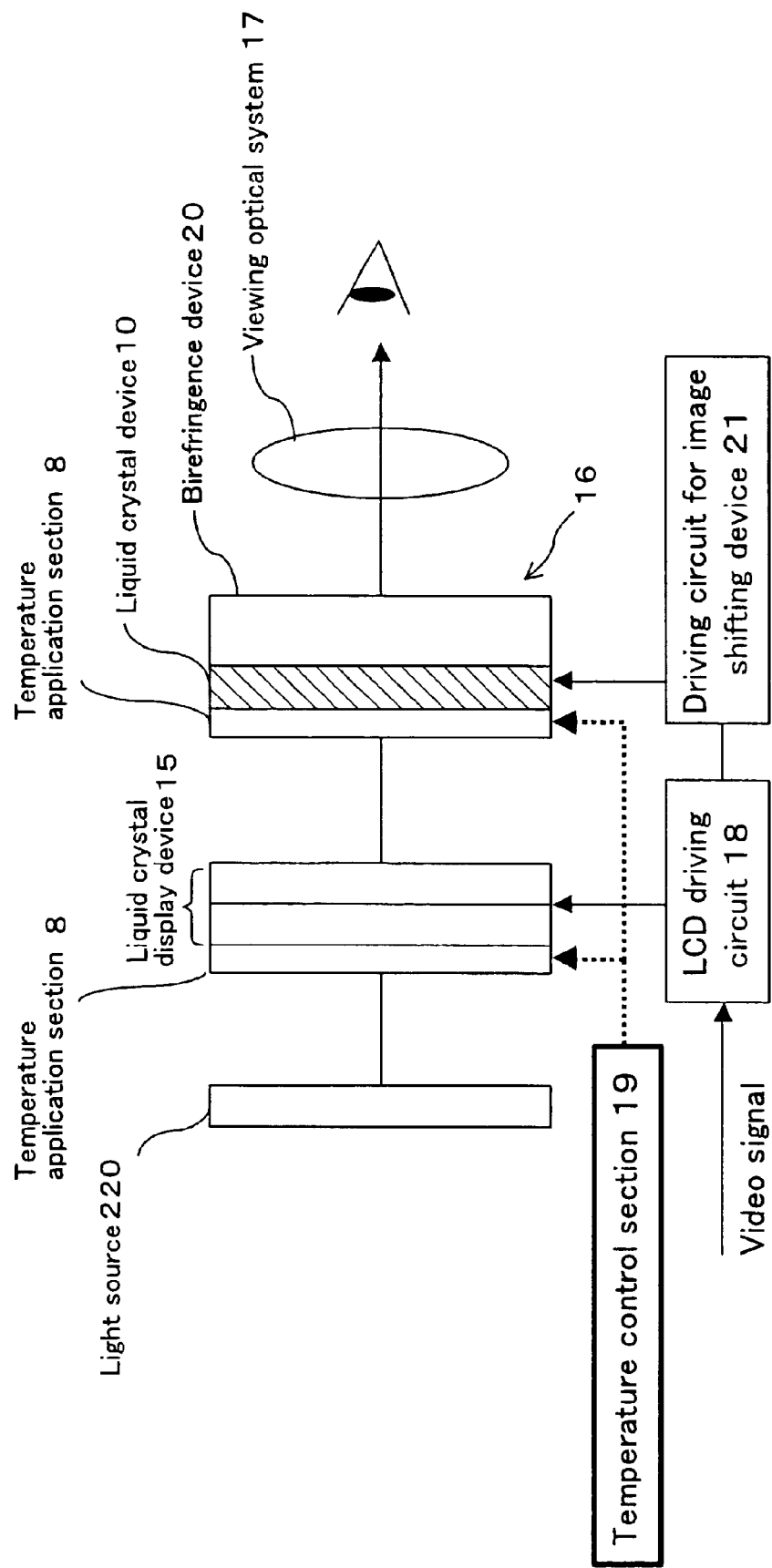
FIG. 7 is a schematic diagram illustrating the configuration of an image display apparatus of Embodiment 5.

FIG. 7 is a schematic diagram illustrating the configuration of an image display apparatus of the present embodiment. The image display apparatus of the present embodiment includes a light source 220, a transmission type liquid crystal display device 15 for modulating light from the light source 220, an image shifting device 16 and a viewing optical system 17. The liquid crystal display device 15 may be the liquid crystal display device as described in Embodiment 1 or 2, and the image shifting device 16 may be the image shifting device as described in Embodiment 4.

The light source 220 may be a backlight or a projection light source for illuminating the liquid crystal display device 15. The liquid crystal display device 15 receives a driving signal and a video signal from LCD (liquid crystal display device) driving circuit 18 to display image information according to the video signal. The temperature of the liquid crystal layer of the liquid crystal display device 15 is adjusted by the temperature adjustment member including the temperature application section 8 and a temperature control section 19. The viewing optical system 17 is an optical system for optically enlarging the image displayed by the liquid crystal display device 15. The viewer may view the image displayed by the liquid crystal display device 15 via the image shifting device 16 and the viewing optical system 17.

The operation of the image shifting device 16 is controlled by a driving circuit 21 for an image shifting device.

Specifically, the driving circuit 21 receives a video signal from the LCD driving circuit 18 to supply, to the image shifting device 16, a driving signal that is synchronized with the video display operation of the liquid crystal display device 15. In this way, the image shifting device 16 can optically shift the image displayed on the liquid crystal display device 15 for every frame. The temperature of the liquid crystal layer of the image shifting device 16, as that of the liquid crystal display device 15, can be uniformly controlled at an intended level by the temperature adjustment member including the temperature application section 8 and the temperature control section 19. The temperature control section 19 of the present embodiment controls the temperature of each of the temperature application sections 8 of the liquid crystal display device 15 and the image shifting device 16 without receiving a control signal from the LCD driving circuit 18, i.e., independently of the LCD driving circuit 18.

With the image display apparatus of the present embodiment, the response speed of the liquid crystal material in each of the liquid crystal display device 15 and the image shifting device 16 is improved, thereby stabilizing the display quality. Note that while the temperatures of both the liquid crystal display device 15 and the image shifting device 16 are controlled in the present embodiment, only the temperature of the liquid crystal display device 15 or the image shifting device 16 may be controlled. Improvement in the image quality can be expected even when the temperature of only one of the liquid crystal display device 15 and the image shifting device 16 is controlled.

Moreover, while the liquid crystal display device 15 for modulating light from the light source 220 is used in the present embodiment, a self-luminous display device may alternatively be used. For example, an organic electroluminescence (EL) display device, an inorganic EL display device, a plasma display panel (PDP), or the like, may be used.

Embodiment 6 (Projection Type Image Display Apparatus)

The image display apparatus of the present invention can also be applied to a projection type display apparatus as well as to a direct-view type apparatus as illustrated in FIG. 7. The projection type image display apparatus of the present embodiment is a projection type liquid crystal display apparatus using dichroic mirrors and a microlens array. The projection type liquid crystal display apparatus of the present embodiment will be described with reference to FIG. 8 to FIG. 10.

Figure 8:
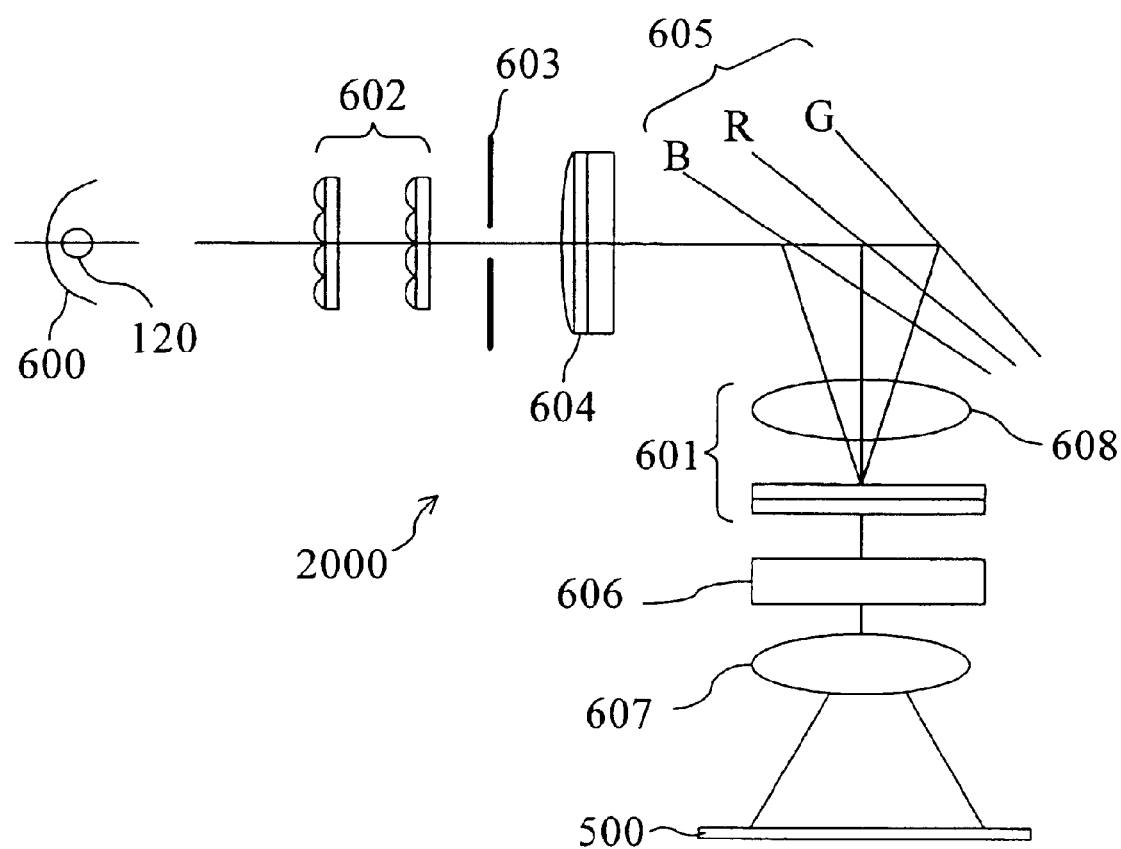
FIG. 8 is a schematic diagram illustrating a projection type liquid crystal display apparatus 2000 of Embodiment 6.

FIG. 8 is a schematic diagram illustrating a projection type liquid crystal display apparatus 2000 of the present embodiment. The projection type liquid crystal display apparatus 2000 of the present embodiment includes the light source lamp 120, a parabolic mirror 600 for reflecting a light beam (white light beam) from the light source lamp 120 while substantially collimating the light beam, a liquid crystal display device 601 for modulating the light from the parabolic mirror 600, and an image shifting device 606 for periodically optically shifting the light that has been modulated through the liquid crystal display device 601.

Moreover, the projection type liquid crystal display apparatus 2000 of the present embodiment further includes a fly-eye lens 602 for uniformly illuminating the liquid crystal display device 601 with the light from the parabolic mirror 600, an aperture 603 provided on the output side of the fly-eye lens 602 for regulating the collimation of the light to be incident upon the liquid crystal display device 601, a condenser lens 604 for focusing the light that has passed through the aperture 603, dichroic mirrors 605R, 605G and 605B for separating the R, G and B components of the light that has been focused through the condenser lens 604, a microlens array 608 including one microlens for every set of three (R, G and B) pixels, and a projection lens 607 for projecting the light that has been optically shifted through the image shifting device 606 onto the screen 500.

The operation of the projection type liquid crystal display apparatus 2000 of the present embodiment will be described. The light beam (white light beam) from the light source 120 is reflected and substantially collimated by the parabolic mirror 600, and then guided to the dichroic mirrors 605R, 605G and 605B through the fly-eye lens 602, the aperture 603 and the condenser lens 604. The light components of different colors separated by the dichroic mirrors 605R, 605G and 605B are incident upon the liquid crystal display device 601 at different angles. The light modulated through the liquid crystal display device 601 is periodically optically shifted through the image shifting device 606, and then forms an image on the screen 500 via the projection lens 607.

Figure 9:
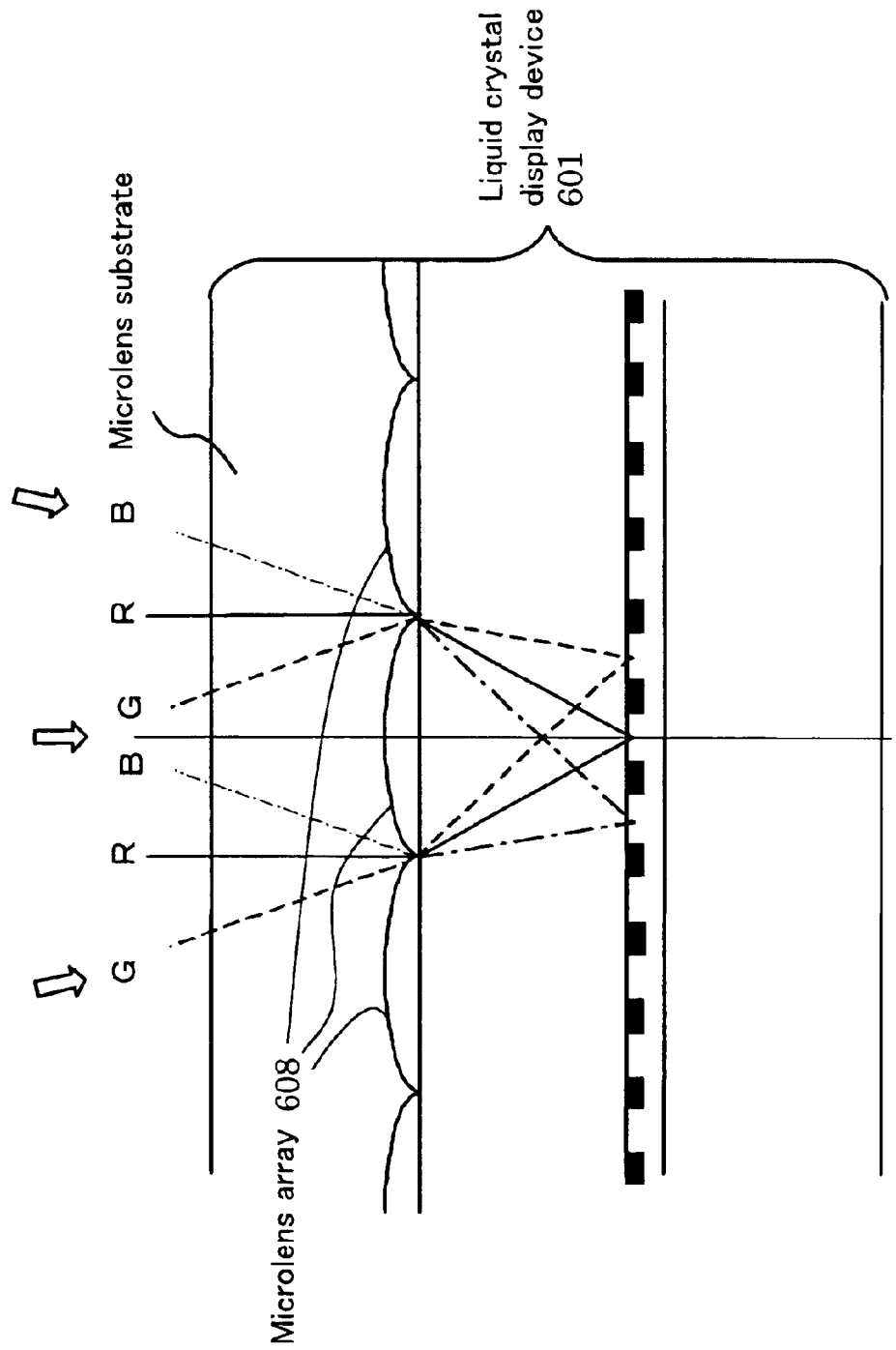
FIG. 9 is a schematic diagram illustrating R, G and B light beams being incident upon a liquid crystal display device 601.

FIG. 9 is a schematic diagram illustrating R, G and B light beams being incident upon the liquid crystal display device 601. A microlens substrate on which the microlens array 608 is formed is provided on the light-receiving side of the liquid crystal display device 601. The R, G and B light beams incident upon a microlens at different angles are transmitted therethrough toward pixels corresponding to the R, G and B light beams, respectively. The optical transmittance of each pixel is modulated independently of the other pixels, and thus the R, G and B light beams are modulated independently.

Figure 10:
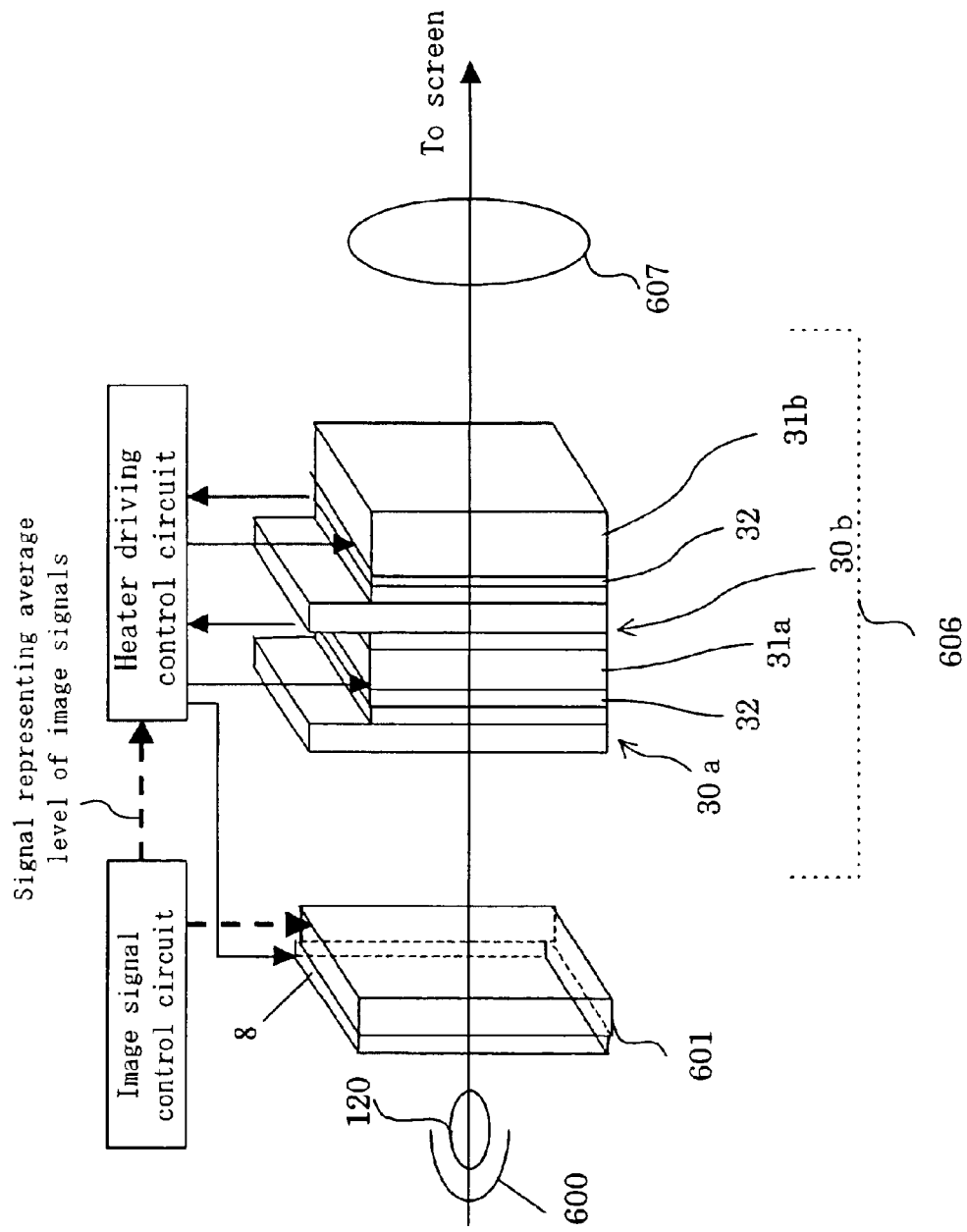
FIG. 10 is a schematic diagram illustrating an exemplary arrangement of the liquid crystal display device 601 and an image shifting device 606.

FIG. 10 is a schematic diagram illustrating an exemplary arrangement of the liquid crystal display device 601 and an image shifting device 606 used in the present embodiment. The liquid crystal display device 601 includes the temperature application section 8 on the light-receiving side (the side that is closer to the light source lamp 120) thereof The liquid crystal display device 601 is similar to the liquid crystal display device as described in Embodiment 1 or 2. Therefore, the various components of the liquid crystal display device 601 will not be further described below.

The image shifting device 606 includes two image shifting devices, each including a liquid crystal device and a birefringence device. Each image shifting device includes a temperature application section (not shown). The image shifting device 606 includes a first liquid crystal device 30a, a first birefringence device 31a, a second liquid crystal device 30b and a second birefringence device 31b, which are arranged in this order from the light-receiving side. These components are bonded together with a commercially available thermosetting transparent resin 32, or the like. The liquid crystal devices 30a and 30b and the birefringence devices 31a and 31b are similar to the liquid crystal device 10 and the birefringence device 20, respectively, of the image shifting device as described in Embodiment 4. Therefore, the various components of the liquid crystal devices 30a and 30b and the birefringence devices 31a and 31b will not be further described below.

The liquid crystal display device 601 and the liquid crystal devices 30a and 30b each include a temperature adjustment member. The temperature adjustment member includes a transparent temperature application section, and a heater driving control circuit (temperature control section) connected to the temperature application section. The temperature application section is controlled by the heater driving control circuit.

The heater driving control circuit (temperature control section) of the present embodiment is controlled by an image signal control circuit for sending an image signal to the liquid crystal display device 601. The control operation by the image signal control circuit is performed by sending the average value of the image signals to be sent to the pixels in one subfield period (hereinafter referred to as "average level signal") to the heater driving control circuit (temperature control section). The reason for controlling the heater driving control circuit (temperature control section) with the average level signal will be briefly described. In the liquid crystal display device 601 and the liquid crystal devices 30a and 30b, there may occur a substantial difference between the response speed when turning ON the voltage application and that when turning OFF the voltage application, i.e., between the rising response time ($\tau_{on}$) and the falling response time ($\tau_{off}$). When the response times $\tau_{on}$ and $\tau_{off}$ are shifted from each other, a double image phenomenon occurs, and flicker occurs due to the double image phenomenon, thereby causing a defective display. The shift in the response time is closely related to the temperature of the liquid crystal layer. On the other hand, the image signals sent to the liquid crystal display device 601 are at different levels for different pixels, whereby the temperature of the liquid crystal layer varies across the panel plane. Therefore, in order to suppress the variations in the liquid crystal temperature across the panel plane, the heater driving signal is controlled (corrected) with the average level signal, i.e., the variations in the temperature control across the panel plane are suppressed. In this way, the shift in the response time is reduced in the liquid crystal display device 601 and the liquid crystal devices 30a and 30b.

In the projection type liquid crystal display apparatus 2000 of the present embodiment, the temperatures of the liquid crystal display device 601 and the liquid crystal devices 30a and 30b can be uniformly controlled at an optimal value, thereby improving the response speed of the liquid crystal material and improving the image quality. Note that the birefringence devices 31a and 31b may also include the temperature adjustment member as well as the liquid crystal display device 601 and the liquid crystal devices 30a and 30b.

The image shifting device 606 periodically shifts the light from the liquid crystal display device 601 in a direction perpendicular to the optical axis thereof in synchronization with the switching of the image displayed on the liquid crystal display device 601. A 3-position or 4-position image shifting operation can be performed by appropriately switching the polarization to be achieved by the birefringence devices: 31a and 31b. In this way, the apparent number of display pixels can be increased three- or four-fold.

In the projection type liquid crystal display apparatus 2000 of the present embodiment, the shifting operation by the image shifting device 606 is performed in synchronization with the image signal whose period corresponds to the subframe period of the liquid crystal display device 601. Specifically, shifting is done successively by one pixel in one direction (the vertical direction or the horizontal direction). In this way, images of the liquid crystal display device 601 are combined together to form a high-definition image on the screen 500.

With the projection type liquid crystal display apparatus 2000 of the present embodiment, the temperature of the liquid crystal panel is uniformly controlled in an optimal range, thereby improving the response speed of the liquid crystal display device 601 and the image shifting device 606 and improving the display quality. Note that while the temperatures of both the liquid crystal display device 601 and the image shifting device 606 are controlled in the present embodiment, only the temperature of the liquid crystal display device 601 or the image shifting device 606 may be controlled. Improvement in the image quality can be expected even when the temperature of only one of the liquid crystal display device 601 and the image shifting device 606 is controlled.

Next, specific examples of the present invention will be described along with comparative examples. The present invention is not limited to these examples.

EXAMPLES 1 to 6 and COMPARATIVE EXAMPLES 1 to 5

The liquid crystal display device used in Examples 1 to 6 and Comparative Examples 1 to 5 is the passive matrix transmission type liquid crystal display device as described in Embodiment 1. First, using a technique known in the art, an ITO film was formed by vapor deposition on a transparent glass substrate as the first substrate, and then patterned to form the display electrode.

An ITO film was formed as a temperature application section across the entire surface of a transparent glass substrate as the second substrate, and then metal electrode terminals for temperature detection were formed at predetermined positions by vapor deposition. Furthermore, a transparent interlayer insulating film of an acrylic resin material was formed, and a display ITO film for the opposing side was formed by patterning. A liquid crystal alignment film was formed on both of the first and second substrates, and subjected to a rubbing treatment. The substrates were attached to each other via a cell spacer (4 µm) and a sealant therebetween, thereby producing a liquid crystal display panel.

The liquid crystal materials as shown in Table 1 below were each injected into the gap between the substrates by vacuum injection and then sealed, thereby producing TN type liquid crystal display devices. The produced liquid crystal panels were subjected to a response time evaluation (driving voltage: 5 V) using a polarizing microscope under a predetermined temperature-controlled environment. The evaluation results are shown in Table 2 below.

TABLE 1

| LC material | LC $T_{NI}$ temp (° C.) | Reference temp Ta (° C.) | Rotational viscosity $\gamma_1$ (mPa · s) 25° C. | Ta (° C.) | Δn (° C.) |
|---|---|---|---|---|---|
| Ex 1, 2 Comp Ex 1, 2 | A | 85 | 60 | 383 | 184 | 0.112 |
| Ex 3, 4 Comp Ex 3, 4 | B | 92 | 67 | 436 | 197 | 0.118 |
| Ex 5, 6 Comp Ex 5 | C | 92 | 67 | 458 | 202 | 0.115 |

Note:
Ta = $T_{NI}$ − ($T_2$ − $T_1$)/2 (° C.) (where $T_1$ = 15 and $T_2$ = 65)

TABLE 2

| | LC material | LC $T_{NI}$ temp (° C.) | Reference temp Ta (° C.) | Panel temp T (° C.) | Response time (ms) | | τ for intermediate gray level | CR |
|---|---|---|---|---|---|---|---|---|
| | | | | | $\tau_{on}$ | $\tau_{off}$ | | |
| Ex 1 | A | 85 | 60 | 70 ($T_{NI}$-15(T1)) | 2.2 | 12.5 | 17.1 | 250 |
| Ex 2 | A | 85 | 60 | 20 ($T_{NI}$-65(T2)) | 4.9 | 16.6 | 19.2 | 262 |
| Comp Ex 1 | A | 85 | 60 | 72 ($T_{NI}$-13) | 1.9 | 11.8 | 16.6 | 137 |
| Comp Ex 2 | A | 85 | 60 | 18 ($T_{NI}$-67) | 5.5 | 18.8 | 24.5 | 265 |
| Ex 3 | B | 92 | 67 | 75 ($T_{NI}$-17) | 2.5 | 13.2 | 17.8 | 261 |
| Ex 4 | B | 92 | 67 | 30 ($T_{NI}$-62) | 5.3 | 16.7 | 19.5 | 280 |
| Comp Ex 3 | B | 92 | 67 | source terminal region 78 ($T_{NI}$-14) | 2.4 | 12.8 | 16.6 | 140 |
| Comp Ex 4 | B | 92 | 67 | 26 ($T_{NI}$-66) | 6.2 | 22.5 | 39.3 | 282 |
| Ex 5 | C | 92 | 67 | 75 ($T_{NI}$-17) | 3.1 | 15.8 | 20.0 | 254 |
| Ex 6 | C | 92 | 67 | 30 ($T_{NI}$-62) | 5.7 | 18.6 | 24.3 | 275 |
| Comp Ex 5 | C | 92 | 67 | 24 ($T_{NI}$-68) | 7.0 | 24.8 | 39.9 | 283 |

The panel response time was evaluated with a driving voltage of 5 V. The response time τ for intermediate gray level was defined as the relaxation response time when the applied voltage was raised from zero to a voltage $V_{80}$ that gives a transmittance of 80%. Note that the target value for the response time needs to be about 17 ms or less in order to display an image at a field frequency of 60 Hz, and is preferably 20 ms or less for intermediate gray levels. In this evaluation test, the contrast ratio (CR) of the liquid crystal panel needs to be 200 or more for a satisfactory display quality.

The results shown in Table 1 and Table 2 indicate that it is possible to realize a high display quality and a high response speed by controlling the temperature T of the liquid crystal panel in a range defined herein. It can also be seen that the response time is further improved by limiting the rotational viscosity $\gamma_1$ of the liquid crystal material in a range defined herein.

for three TN liquid crystal panels (LC panel #1-3) using the liquid crystal materials A, B and C, respectively. The results are shown in Table 3 below.

The response time of each liquid crystal panel was evaluated in terms of the rising response time (τr) and the falling response time (τd) at a driving voltage of 5 V, and the target value for the response time (τr, τd) was 17 ms or less. The response time τ for intermediate gray level was evaluated as the response time when the applied voltage was raised from zero to the voltage $V_{80}$ that gives a transmittance of 80%, and the target value therefor was 20 ms or less. The contrast ratio (CR) of each liquid crystal panel was evaluated with the liquid crystal panel being placed between a pair of polarizing plates in a crossed Nicols arrangement and with a reference light source as a backlight, and the target value therefor was 200 or more.

TABLE 3

| LC panel # | LC material | $T_{NI}$ (° C.) | Display quality evaluated at various panel temperatures T (° C.) | | | | | | | | |
|---|---|---|---|---|---|---|---|---|---|---|---|
| | | | 15 | 20 | 30 | 40 | 60 | 65 | 70 | 75 | 80 |
| 1 | A | 85 | $T_{NI}$-70 poor | $T_{NI}$-65 good | $T_{NI}$-55 good | $T_{NI}$-45 good | $T_{NI}$-25 very good | $T_{NI}$-20 good | $T_{NI}$-15 good | $T_{NI}$-10 poor | $T_{NI}$-5 poor |
| 2 | B | 92 | $T_{NI}$-77 poor | $T_{NI}$-72 poor | $T_{NI}$-62 good | $T_{NI}$-52 good | $T_{NI}$-32 good | $T_{NI}$-27 good | $T_{NI}$-22 very good | $T_{NI}$-17 good | $T_{NI}$-12 poor |
| 3 | C | 92 | $T_{NI}$-77 poor | $T_{NI}$-72 poor | $T_{NI}$-62 good | $T_{NI}$-52 good | $T_{NI}$-32 good | $T_{NI}$-27 very good | $T_{NI}$-22 good | $T_{NI}$-17 Fair | $T_{NI}$-12 poor |

As can be seen from Example 5, Example 6 and Comparative Example 5, it is difficult to control the response time of the liquid crystal panel in a target value range with the liquid crystal material C whose rotational viscosity value $\gamma_1$ exceeds 200 mPa·s at the reference temperature Ta. Nevertheless, as can be seen from Example 5 and Example 6, the response speed was improved by controlling the panel temperature T (° C.).

Next, the effect of the panel temperature T (° C.) on the display quality of a liquid crystal panel was examined as follows. The overall display quality (the response time, the response time for intermediate gray level, and the contrast ratio) was evaluated at various panel temperatures T (° C.)

In Table 3, "good" is used when all the evaluation criteria met the respective target values, and "very good" is used for the temperature condition under which the display quality (the response speed and the contrast) when displaying a moving image was best balanced for each liquid crystal panel. Moreover, "fair" is used when only the contrast ratio and the response time (τr, τd) met the target values while the response time for intermediate gray level failed to meet the target value. Otherwise, "poor" is used, indicating that the display quality deteriorated significantly.

As can be seen from Table 3, the results confirm that the response speed and the contrast ratio of the liquid crystal panel can meet the respective target values, i.e., a desirable display quality can be achieved, irrespective of the liquid crystal material used, by setting the temperature of the liquid crystal panel in a range where it is equal to or greater than $T_{NI}$-65 and less than or equal to $T_{NI}$-15, and preferably in a range where it is equal to or greater than $T_{NI}$-30 and less than or equal to $T_{NI}$-20.

As described above, the display quality of a liquid crystal panel can be improved very effectively by providing the liquid crystal panel with a temperature adjustment function and controlling the temperature of the panel at an optimal value.

EXAMPLE 7 and COMPARATIVE EXAMPLE 6

The liquid crystal display device used in Example 7 and Comparative Example 6 is the active matrix transmission type liquid crystal display device as described in Embodiment 2. First, using a technique known in the art, a plurality of thin film transistor (TFT) devices and pixel electrodes are formed in a matrix pattern on a transparent glass substrate to obtain a TFT substrate.

The counter substrate of Example 7 was produced by forming, by patterning, an ITO film as the temperature application section and metal electrode terminals for temperature detection on a transparent glass substrate, depositing a transparent insulative protection film thereon, and further forming, by vapor deposition, an ITO film as the counter electrode. A liquid crystal alignment film was formed on both of the substrates, and subjected to a rubbing treatment. The substrates were attached to each other via a cell spacer (4 μm) and a sealant therebetween, thereby producing a liquid crystal display panel as illustrated in FIG. 2.

The counter substrate of Comparative Example 6 is a conventional counter substrate in which the counter electrode (ITO film) is formed on a transparent glass substrate, and in which the temperature application section and the metal electrode terminals are absent. A liquid crystal display panel was produced as in Example 7 using the counter substrate.

For the liquid crystal display panels of Example 7 and Comparative Example 6, the liquid crystal material B shown in Table 1 was injected into the gap between the substrates by vacuum injection and then sealed, thereby producing TN type liquid crystal display devices. The produced liquid crystal panel was used as a light bulb of a projection type liquid crystal display apparatus (liquid crystal projector) as illustrated in FIG. 4, and the quality of the projection display of the projector was evaluated.

In Example 7, the evaluation was performed while setting the temperature T of the liquid crystal light bulb to 30° C. ($T_{NI}$-62° C.). In Example 7, where the temperature of the liquid crystal light bulb was optimally controlled, substantially no after-image phenomenon was observed even when displaying a moving image. However, with the conventional panel settings of Comparative Example 6, some after-image phenomenon was observed when displaying a moving image. Thus, it was confirmed that the response speed of a liquid crystal projector can be improved effectively by using the liquid crystal display device of the present invention as a light bulb.

EXAMPLES 8 AND 9

The TFT substrate was produced as in Example 7. The counter substrate was produced by forming, by patterning, a display ITO electrode film and metal electrode terminals for temperature detection on a transparent glass substrate. Liquid crystal display panels were produced as in Example 7. The liquid crystal material B shown in Table 1 was injected into the gap between the substrates by vacuum injection and then sealed, thereby producing TN type liquid crystal display devices.

In the liquid crystal display device of Example 8, a halogen heater lamp (manufactured by USHIO Inc.) unit that radiates far infrared rays was provided as a temperature adjustment member on the outer side (the side that is away from the liquid crystal layer) of the counter substrate. In the liquid crystal display device of Example 9, a temperature adjustment unit including a Peltier device was provided on the outer side of the counter substrate. The unit of each of Example 8 and Example 9 was connected to the temperature control section, thereby producing a liquid crystal display device with a temperature adjustment function in which the temperature adjustment member was provided outside the liquid crystal panel.

The liquid crystal display devices of Example 8 and Example 9 were used as light bulbs of liquid crystal projectors as illustrated in FIG. 4, and the quality of the projection display of each of the projectors was evaluated. Similar effects were observed for both of Example 8 and Example 9 when the evaluation was performed while the temperature T of the liquid crystal light bulb was set to 30° C. ($T_{NI}$-62° C.). Thus, it is possible to realize a high display quality and a high response speed by optimally controlling the temperature of the liquid crystal panel even when the temperature adjustment member is provided outside the liquid crystal light bulb.

EXAMPLE 10 AND COMPARATIVE EXAMPLE 7

An example and a comparative example of the projection type image display apparatus as described in Embodiment 6 will be described with reference to FIG. 8 to FIG. 10. Note that the liquid crystal display device used in Example 10 and Comparative Example 7 is the active matrix transmission type liquid crystal display device as described in Embodiment 2.

In the liquid crystal display device 601 of Example 10, an ITO film as the temperature application section 8 and metal electrode terminals for temperature detection are formed, by patterning, on the outer side of the microlens array substrate of the counter substrate. On the other hand, the counter substrate of Comparative Example 7 is an ordinary microlens array substrate that does not have a temperature adjustment function. In Example 10 and Comparative Example 7, TN type liquid crystal display devices were produced using the liquid crystal material A shown in Table 1.

The image shifting device of Example 10 was formed by layering together a liquid crystal device provided with an ITO transparent heater electrode for temperature adjustment, and a birefringence device. In Comparative Example 7, an ordinary liquid crystal device that is not provided with a heater was used. A 3-position image shifting device was formed, and a projection type image display apparatus as illustrated in FIG. 8 was produced.

The quality of the projection display of the produced projection type image display apparatus was evaluated. The evaluation was performed with a video image in which the subfield driving operation of the liquid crystal display device and that of the image shifting device were synchronized with each other.

In Example 10, the displayed video image was evaluated while setting the temperature T of each of the liquid crystal panels of the liquid crystal display device and the image shifting device to 70° C. ($T_{NI}$-15° C.). In Example 10, where the temperature of the liquid crystal light bulb was optimally controlled, a double image phenomenon, or a mistimed shifting operation or color mixing due to a poor response of the liquid crystal material to an applied voltage, was not observed even when projecting a moving image through an image shifting operation.

However, with the conventional liquid crystal display device of Comparative Example 7, a double image phenomenon occurred due to a mistimed image shifting operation, thereby causing flicker, even though the evaluation was performed with the same video image as Example 10.

Thus, it was confirmed that defining the temperature of a liquid crystal panel and further designing the rotational viscosity value of the liquid crystal composition improves the response speed of the liquid crystal panel, thereby significantly improving the image quality of the display apparatus. Therefore, the present invention provides an image display apparatus having a desirable image quality.

With the liquid crystal display device of the present invention, it is possible to effectively improve the response speed to realize a high-speed liquid crystal display without detracting from the brightness and the contrast. It is possible to improve the response speed by an easy approach for liquid crystal panels of various specifications and display modes. Particularly, it is possible to improve the quality and the response speed of the liquid crystal display device more effectively by also optimizing the rotational viscosity value $\gamma_1$ of the liquid crystal composition of the liquid crystal layer. Therefore, the liquid crystal display device of the present invention can suitably be used in a liquid crystal display apparatus where a full-color, high-quality display is required, can suitably be used as the liquid crystal light bulb of a projection type liquid crystal display apparatus where a high lightfastness is required.

With the image shifting device of the present invention, it is possible to shorten the response time to the voltage level of the liquid crystal display device or that of the liquid crystal device. The uniformity of voltage response among the liquid crystal devices is improved, thereby improving the response speed of the liquid crystal material in a subfield period. Thus, it is possible to provide an image display apparatus utilizing the image shifting technique with which an image can be displayed with a high quality and with a high resolution.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A liquid crystal display device, comprising:
   a first substrate;
   a second substrate opposing the first substrate;
   a liquid crystal layer provided in a gap between the first substrate and the second substrate; and
   a temperature adjustment member formed on the first substrate and/or the second substrate,
   wherein a panel temperature T (° C.) of the liquid crystal display device is controlled to be equal to or greater than $T_{NI}$-65 and less than or equal to $T_{NI}$-15, where $T_{NI}$ (° C.) is a nematic-isotropic phase transition temperature of a liquid crystal composition of the liquid crystal layer.

2. The liquid crystal display device of claim 1, wherein a rotational viscosity $\gamma_1$ of the liquid crystal composition is less than or equal to 200 mPa·s at a temperature of $T_{NI}$-25 (° C.).

3. The liquid crystal display device of claim 2, wherein the rotational viscosity $\gamma_1$ of the liquid crystal composition is equal to or greater than 20 mPa·s at a temperature of $T_{NI}$-25 (° C.).

4. The liquid crystal display device of claim 1, wherein the temperature adjustment member includes a light-transmissive temperature application section formed on at least one surface of the first substrate and the second substrate, and a temperature control section connected to the temperature application section.

5. The liquid crystal display device of claim 4, wherein the temperature application section is made of a transparent conductive film.

6. The liquid crystal display device of claim 4, wherein the temperature application section is formed, by patterning, corresponding to a predetermined display area.

7. The liquid crystal display device of claim 4, wherein a display electrode is formed on the temperature application section via a transparent insulating layer.

8. The liquid crystal display device of claim 4, wherein the temperature application section is an infrared heater.

9. The liquid crystal display device of claim 1, wherein the temperature adjustment member includes a Peltier device.

10. A projection type liquid crystal display apparatus, comprising:
    a light source;
    a color separation optical system for dividing a light beam from the light source into a plurality of color light beams of different colors;
    a plurality of liquid crystal display devices provided so as to correspond respectively to the plurality of color light beams separated by the color separation optical system;
    a color synthesis optical system for synthesizing together the plurality of color light beams modulated respectively through the plurality of liquid crystal display devices; and
    a projection optical system for projecting the plurality of color light beams, which have been synthesized together by the color synthesis optical system,
    wherein at least one of the plurality of liquid crystal display devices is the liquid crystal display device of claim 1.

11. An image shifting device, comprising at least one set of a liquid crystal device for modulating polarization of light and a birefringence device for shifting an optical path of the light according to the polarization of the light output from the liquid crystal device, wherein:
    the liquid crystal device includes a first substrate, a second substrate opposing the first substrate, a liquid crystal layer provided in a gap between the first substrate and the second substrate, and a temperature adjustment member fanned on the first substrate and/or the second substrate; and
    a panel temperature T (° C.) of the liquid crystal device is controlled to be equal to or greater than $T_{NI}$-65 and less than or equal to $T_{NI}$-15, where $T_{NI}$ (° C.) is a nematic-isotropic phase transition temperature of a liquid crystal composition of the liquid crystal layer.

12. The image shifting device of claim 11, wherein a rotational viscosity $\gamma_1$ of the liquid crystal composition is less than or equal to 200 mPa·s at a temperature of $T_{NI}$-25 (° C.).

13. The image shifting device of claim 11, wherein a rotational viscosity $\gamma_1$ of the liquid crystal composition is equal to or greater than 20 mPa·s at a temperature of $T_{NI}$-25 (° C.).

14. The image shifting device of claim 11, wherein the temperature adjustment member includes a light-transmissive temperature application section formed on at least one surface of the first substrate and the second substrate, and a temperature control section connected to the temperature application section.

15. The image shifting device of claim 14, wherein the temperature application section is made of a transparent conductive film.

16. The image shifting device of claim 14, wherein the temperature application section is formed, by patterning, corresponding to a predetermined display area.

17. The image shifting device of claim 14, wherein a display electrode is formed on the temperature application section via a transparent insulating layer.

18. The image shifting device of claim 14, wherein the temperature application section is an infrared heater.

19. The image shifting device of claim 11, wherein the temperature adjustment member includes a Peltier device.

20. The image shifting device of claim 11, wherein the birefringence device includes a temperature adjustment member.

21. An image display apparatus, comprising:
a light source;
the liquid crystal display device of claim 1 for modulating light from the light source; and
an image shifting device provided on a light-exiting side of the liquid crystal display device for optically shifting, for every display frame, an image displayed on the liquid crystal display device.

22. An image display apparatus, comprising:
a display device; and
the image shifting device of claim 11 provided on a light-exiting side of the display device.

23. The image display apparatus of claim 22, wherein the display device is the liquid crystal display device and includes
a first substrate;
a second substrate opposing the first substrate;
a liquid crystal layer provided in a gap between the first substrate and the second substrate; and
a temperature adjustment member formed on the first substrate and/or the second substrate,
wherein a panel temperature T (° C.) of the liquid crystal display device is controlled to be equal to or greater than $T_{NI}$-65 and less than or equal to $T_{NI}$-15, where $T_{NI}$ (° C.) is a nematic-isotropic phase transition temperature of a liquid crystal composition of the liquid crystal layer.

24. The image display apparatus of claim 21, wherein the image shifting device shifts light output from the display device in synchronization with a display operation of the display device.

25. A projection type liquid crystal display apparatus, comprising:
a light source;
the liquid crystal display device of claim 1 for modulating light from the light source;
an image shifting device provided on a light-exiting side of the liquid crystal display device for optically shifting, for every display frame, an image displayed on the liquid crystal display device; and
a projection optical system for projecting a combined image of shifted images from the image shifting device.

26. A projection type liquid crystal display apparatus, comprising:
a light source;
a liquid crystal display device for modulating light from the light source;
the image shifting device of claim 11 provided on a light-exiting side of the liquid crystal display device; and
a projection optical system for projecting a combined image of shifted images from the image shifting device.

27. The projection type liquid crystal display apparatus of claim 26, wherein the liquid crystal display device is the liquid crystal display device and includes
a first substrate;
a second substrate opposing the first substrate;
a liquid crystal layer provided in a gap between the first substrate and the second substrate; and
a temperature adjustment member formed on the first substrate and/or the second substrate,
wherein a panel temperature T (° C.) of the liquid crystal display device is controlled to be equal to or greater than $T_{NI}$-65 and less than or equal to $T_{NI}$-15, where $T_{NI}$ (° ) is a nematic-isotropic phase transition temperature of a liquid crystal composition of the liquid crystal layer.

* * * * *